(12) United States Patent
Leibowitz et al.

(10) Patent No.: US 8,766,647 B2
(45) Date of Patent: Jul. 1, 2014

(54) METHOD AND APPARATUS FOR POWER SEQUENCE TIMING TO MITIGATE SUPPLY RESONANCE IN POWER DISTRIBUTION NETWORK

(75) Inventors: Brian S. Leibowitz, San Francisco, CA (US); Haechang Lee, Los Altos, CA (US)

(73) Assignee: Rambus Inc., Sunnyvale, CA (US)

( * ) Notice: Subject to any disclaimer, the term of this patent is extended or adjusted under 35 U.S.C. 154(b) by 648 days.

(21) Appl. No.: 12/937,226

(22) PCT Filed: May 5, 2009

(86) PCT No.: PCT/US2009/042900
§ 371 (c)(1), (2), (4) Date: Oct. 8, 2010

(87) PCT Pub. No.: WO2009/137522
PCT Pub. Date: Nov. 12, 2009

(65) Prior Publication Data
US 2011/0043220 A1    Feb. 24, 2011

Related U.S. Application Data

(60) Provisional application No. 61/050,935, filed on May 6, 2008.

(51) Int. Cl.
*G01R 29/26* (2006.01)
*G11C 7/00* (2006.01)

(52) U.S. Cl.
USPC .......... 324/613; 324/600; 324/612; 365/206; 365/226

(58) Field of Classification Search
USPC .................... 327/551; 324/612–614; 365/206
See application file for complete search history.

(56) References Cited

U.S. PATENT DOCUMENTS

| | | | |
|---|---|---|---|
| 5,343,381 A | 8/1994 | Bolduc et al. | |
| 5,619,465 A * | 4/1997 | Nomura et al. | 365/206 |
| 5,646,572 A * | 7/1997 | Masleid | 327/542 |
| 5,953,237 A * | 9/1999 | Indermaur et al. | 700/295 |
| 6,215,372 B1 | 4/2001 | Novak | |
| 6,424,222 B1 * | 7/2002 | Jeong et al. | 330/285 |
| 6,753,481 B2 | 6/2004 | Novak | |

(Continued)

FOREIGN PATENT DOCUMENTS

| | | |
|---|---|---|
| EP | 1 830 269 A1 | 9/2007 |
| WO | WO 02/056159 A2 | 7/2002 |
| WO | WO 2007/041151 A2 | 4/2007 |
| WO | WO 2007/108383 A1 | 9/2007 |

OTHER PUBLICATIONS

PCT International Search Report and Written Opinion, PCT/US2009/042900, Jun. 14, 2010, 25 Pages.

(Continued)

*Primary Examiner* — Huy Q Phan
*Assistant Examiner* — James Split
(74) *Attorney, Agent, or Firm* — Fenwick & West LLP

(57) ABSTRACT

The transient load current of a circuit powered by a power distribution network is increased in a plurality of steps, with the step transition times being adjusted based on the transient noise of the power distribution network. This reduces the resonance noise that would otherwise occur in the supply current of the power distribution network.

29 Claims, 16 Drawing Sheets

(56) References Cited

U.S. PATENT DOCUMENTS

| | | | |
|---|---|---|---|
| 6,903,634 | B2 | 6/2005 | Chang |
| 7,268,605 | B2 | 9/2007 | Fang et al. |
| 7,372,323 | B2 * | 5/2008 | von Kaenel et al. .......... 327/551 |
| 7,447,929 | B2 * | 11/2008 | McCall et al. ................. 713/323 |
| 7,525,861 | B2 * | 4/2009 | Huang .......................... 365/222 |
| 2002/0108068 | A1 * | 8/2002 | Coenen ......................... 713/322 |
| 2004/0124715 | A1 | 7/2004 | Huang et al. |
| 2004/0165406 | A1 | 8/2004 | Gauthier et al. |
| 2005/0218972 | A1 | 10/2005 | Hazucha et al. |
| 2005/0275440 | A1 | 12/2005 | Fang et al. |
| 2006/0197549 | A1 | 9/2006 | Nygren |
| 2007/0058410 | A1 * | 3/2007 | Rajan .............................. 365/63 |
| 2007/0234164 | A1 | 10/2007 | Marelli et al. |
| 2007/0257721 | A1 | 11/2007 | von Kaenel et al. |
| 2007/0300104 | A1 * | 12/2007 | Thayer .......................... 714/704 |
| 2008/0222338 | A1 * | 9/2008 | Balasubramanian et al. 710/306 |
| 2009/0072885 | A1 | 3/2009 | Kawasaki |

OTHER PUBLICATIONS

Belcher, "Inductance and Magnetic Energy," Sep. 2007, Retrieved on May 6, 2010, Retrieved from the Internet: URL:http://ocw.mit.edu/NR/rdonlyres/Physics/8-02Spring-2007/057D71D9-6D1D-42EC-837B-967D0C6B006C/0/chap11inductance.pdf, pp. 0-52.

Horst Völz, "Elektronik," Akademie Verlag Berlin, Berlin, 1996, p. 98.

Ang, M. et al., "An On-Chip Voltage Regulator Using Switched Decoupling Capacitors," 2000 IEEE International Solid-State Circuits Conference, IEEE, 2000, 2 pages.

"Chapter 11 Inductance and Magnetic Energy" (BELCHER), retrievable from http://ocw.mit.edu/NR/rdonlyres/Physics/8-02Spring-2007/057D71D9-6D1D-42EC-837B-967D0C6B006C/0/chap11inductance.pdf, Sep. 2007. 53 Pages.

International Preliminary Report with mail date of Nov. 18, 2010 (Chapter 1) with written Opinion for Int'l. Application No. PCT/US2009/042900. 16 Pages.

Nakamura, Y. et al., "An On-Chip Noise Canceller with High Voltage Supply Lines for Nanosecond-Range Power Supply Noise," 2007 Symposium on VLSI Circuits Digest of Technical Papers, 2007, pp. 124-125.

Pant, S. et al., "A Charge-Injection-Based Active-Decoupling Technique for Inductive-Supply-Noise Suppression," 2008 IEEE International Solid-State Circuits Conference, IEEE, 2008, pp. 416-417, p. 624.

Xu, J. et al., "On-Die Supply-Resonance Suppression Using Band-Limited Active Damping," 2007 IEEE International Solid-State Circuits Conference, IEEE, 2007, pp. 286-287, p. 603, pp. 16.1.1-16.1.7.

\* cited by examiner

METHOD AND APPARATUS FOR POWER SEQUENCE TIMING TO MITIGATE SUPPLY RESONANCE IN POWER DISTRIBUTION NETWORK

BACKGROUND

This present disclosure relates to reducing the resonance in a power distribution network.

Power distribution networks for integrated circuits contain inductive and capacitive components. When a circuit connected to a PDN switches on or off between different operating points, the sudden change in the circuit's load current can excite resonance in the inductive and capacitive components of the PDN. Thus, circuits connected to the PDN fail to achieve their specified performance until after the resonance settles out, which results in a waiting time needed by the circuit. Such waiting time limits a variety of parameters associated with the circuit, such as "wake-up" time from a circuit to switch from "sleep mode" to normal operation and latency on bus turn-around in bi-directional data buses.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

According to various embodiments, the transient load current of a circuit powered by a power distribution network is increased in a plurality of steps, with the step transition times being adjusted based on the transient noise of the power distribution network. This reduces the resonance noise that would otherwise occur in the supply current when the power distribution network is switched on.

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

Figure 1:
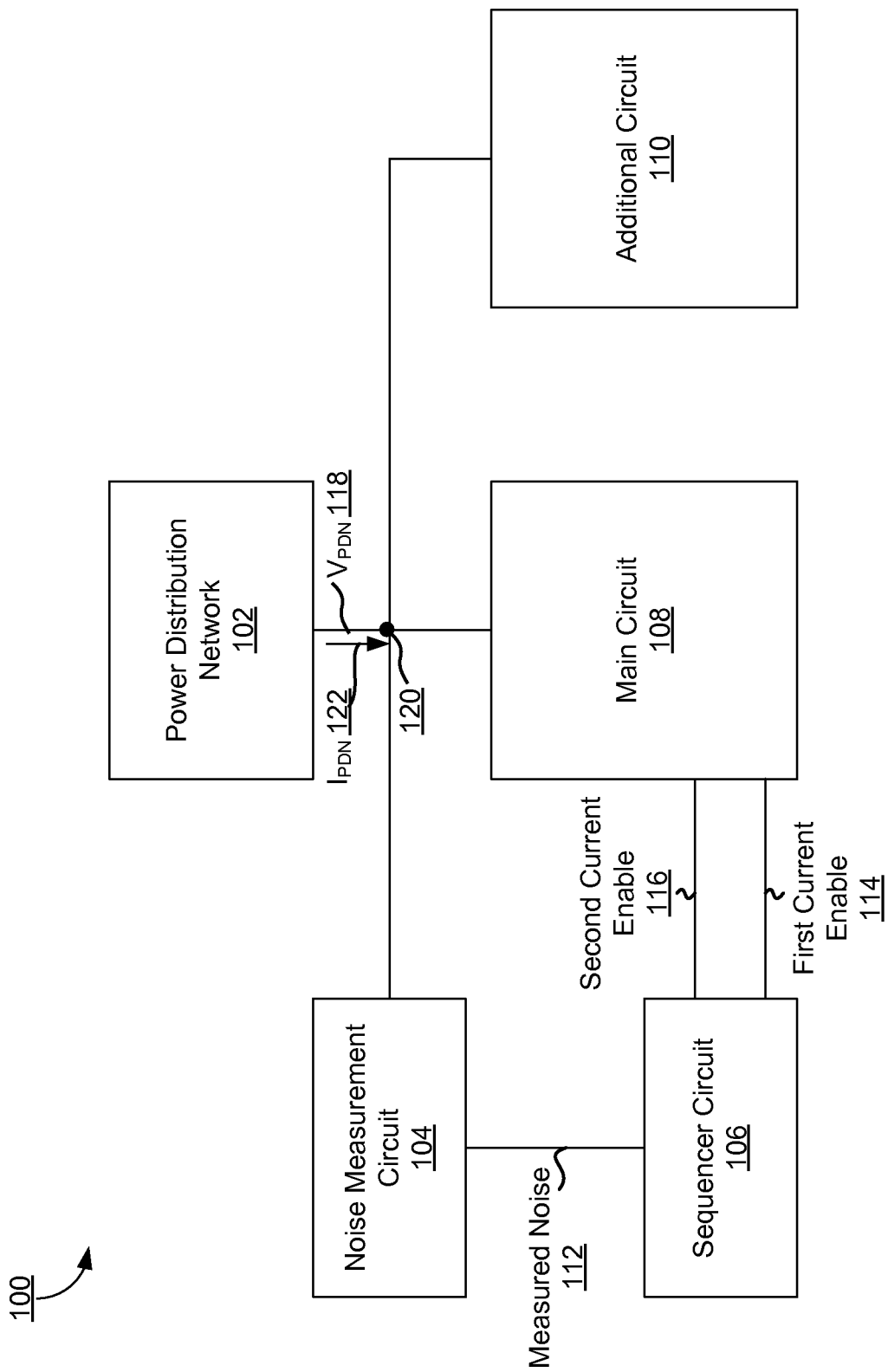
FIG. 1 is a block diagram illustrating a PDN powering connected circuitry, according to one embodiment of the present disclosure.

FIG. 1 is a block diagram illustrating a PDN powering connected circuitry, according to one embodiment of the present disclosure. FIG. 1 illustrates the PDN 102, a noise measurement circuit 104, a sequencer circuit 106, a main circuit 108 and an additional circuit 110. In one embodiment, main circuit 108 is a memory controller and the additional circuit 110 is a memory device such as a DRAM (dynamic random access memory). PDN 102 provides a supply voltage $V_{PDN}$ 118 to main circuit 108 at supply node 120. Noise measurement circuit 104 measures the amount of noise in the supply voltage $V_{PDN}$ 118 at supply node 120. The measured noise includes resonance in the supply voltage $V_{PDN}$ at supply node 120 at a resonant frequency determined by the inductances (not shown) and capacitances (not shown) present in PDN 102. The noise measurement circuit 104 outputs information on the measured noise (possibly including the resonant frequency of PDN 102) to the sequencer circuit 106 via a measured noise signal 112.

As will be explained in more detail below, sequencer circuit 106 and main circuit 108 together enable the transient load current ($I_{LOAD}$ 250 shown in FIGS. 2A and 2B) within the main circuit 108 to be increased in two or more steps when the PDN 102 is switched on, with the timing of the step increase of the transient load current being determined based upon the resonant frequency of the PDN 102. As a result, transient resonance in the supply current $I_{PDN}$ 122 from PDN 102 can be significantly reduced during power up of the PDN 102.

Figure 3:
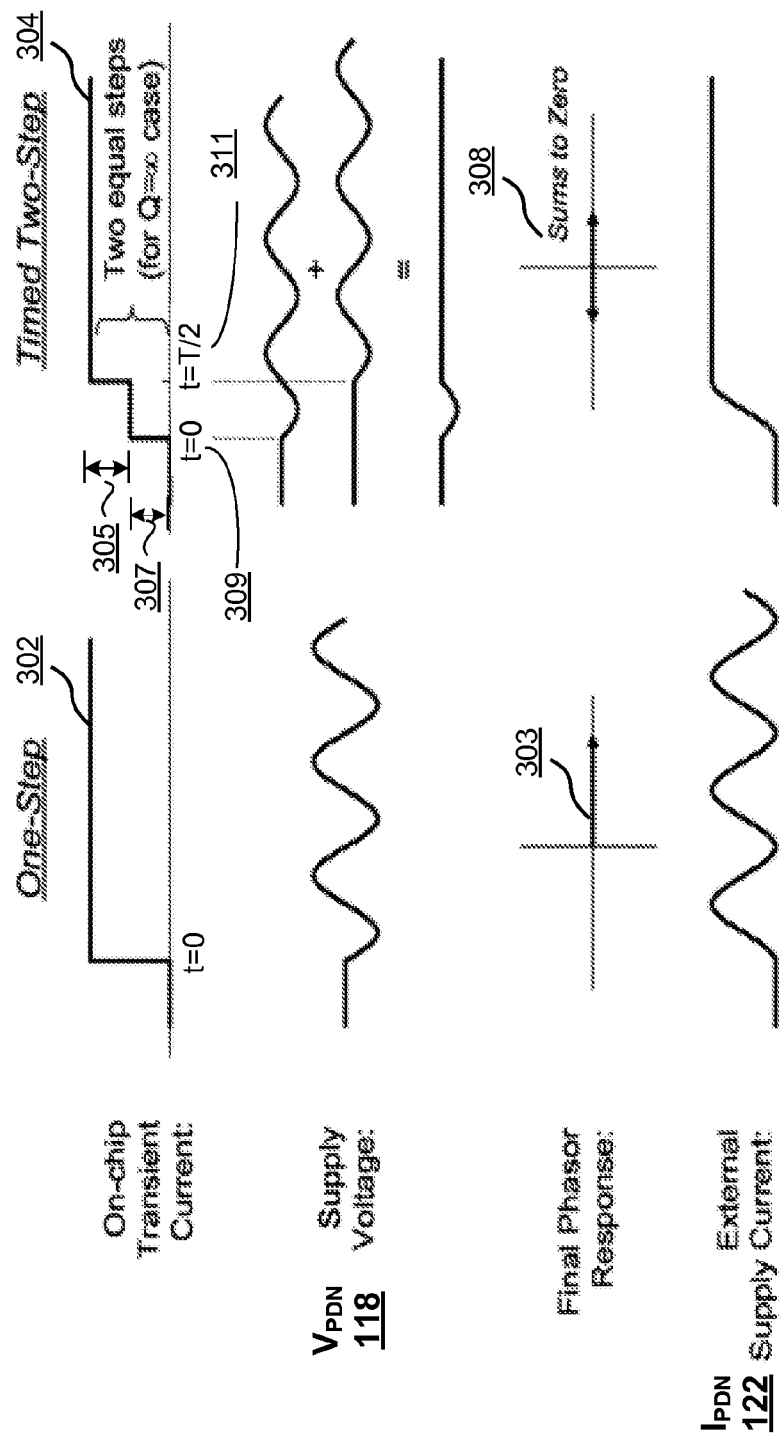
FIG. 3 illustrates a comparison between a one-step and a timed two-step transient load current for a second order PDN with an infinite quality factor (Q factor).

For example, FIG. 3 illustrates a two-step transient load current for a second order PDN 102 with an infinite Q factor according to one embodiment, as compared to one-step transient load current. As shown in FIG. 3, one-step transient load current 302 causes supply voltage $V_{PDN}$ 118 and the supply current $I_{PDN}$ 122 of the PDN 102 to resonate, due to resonance present in PDN 102 as shown by the unidirectional final phasor response 303, which indicates the phase and magnitude of the supply voltage oscillation after t=0. On the other hand, by having transient load current increase in two equal steps, with the first step increase occurring at a first step transition time 309 (t=0) and the second step increase occurring at a second step transition time 311 (t=T/2) equal to half of the resonance period (T) of PDN 102, two canceling antiphase resonances are generated as shown by the canceling final phasor response 308, which cancels all resonance in $V_{PDN}$ 118 after the second step increase. Stepping the transient load current in two equal steps generates a set of tones with a rotationally symmetric phasor diagram 308. As a result, oscillation in the supply current 122 is suppressed and reaches steady state quickly. Stepping the transient load current down in a similar manner to turn off the main circuit 108 can similarly suppress supply current and voltage oscillation. Although FIG. 3 shows two equal steps with the second step increase occurring at a second step transition time equal to the half of the resonance period of PDN 102, the transient load current may be controlled to increase in three or more steps with the step increase occurring at other times determined based on the resonance period of PDN 102. For example, any number of transient load current steps N (not less than 2) spaced at time intervals T/N will result in a rotationally symmetric phasor diagram that sums to zero in an infinite Q case. In addition, each step of the step increase of the transient load current may have a different step size.

Referring back to FIG. 1, sequencer circuit 106 controls the transient load current of the main circuit 108 to increase in two or more steps with the step increases occurring at step transition times determined based on the resonance period of PDN 102. Such information on the resonance period of PDN 102 is included in the measured noise signal 112 or can be determined from the measured noise signal 112 from noise measurement circuit 104. For ease of illustration, the transient load current of main circuit 102 is mainly described herein as increasing in two steps, i.e., as a two-step transient load current. However, it should be understood that the transient load current can be increased in more than two steps.

More specifically, sequencer circuit 106 uses information on the resonant frequency of PDN 102 to generate a first current enable signal 114 and a second current enable signal 116 that determine at what timing (i.e., step transition times) the step increases in the transient load current of the main circuit 102 occurs. For example, as explained in more detail with reference to FIG. 2A below, the first current enable signal 114 causes the first step increase of the transient load current 250 to occur at the first step transition time with a first step size, and the second current enable signal 116 causes the second step increase of the transient load current 250 to occur at the second step transition time with a second step size. In order to cause the first step increase of the transient load current 250 of main circuit 108 to occur, sequencer circuit 106 provides the main circuit 108 with a logic level one via the first current enable signal 114 and a logic level zero via the second current enable signal 116 at the first step transition time. Then, at the appropriate second step transition time, the sequencer circuit 106 maintains the first current enable signal 114 at logic level one, but switches the second current enable signal 116 from logic level zero to logic level one in order to cause the second step increase of the transient load current of the main circuit to occur. By having the transient load current 250 increase from the first step to the second step at the appropriate second transition time determined based on the resonance period of PDN 102, resonance in the supply current $I_{PDN}$ 122 from PDN 102 can be canceled out, which allows the circuits 108, 110 coupled to the PDN 102 to be able operate at an optimal level soon after power on of PDN 102.

Figure 2A:
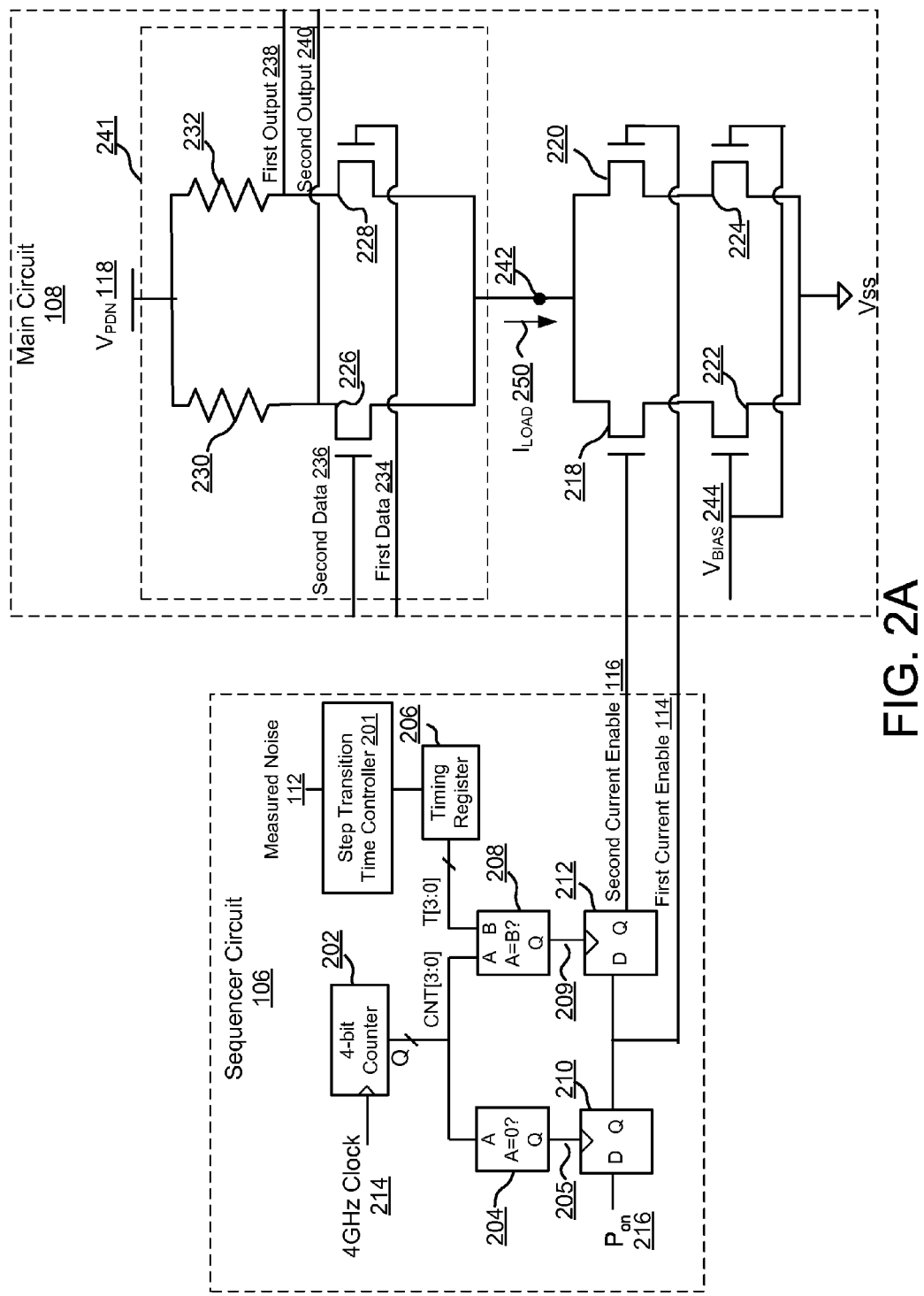
FIG. 2A is a schematic illustrating the sequencer circuit and the main circuit shown in FIG. 1 in more detail, according to one embodiment of the present disclosure.

FIG. 2A is a schematic illustrating the sequencer circuit 106 and the main circuit 108 shown in FIG. 1 in more detail, according to one embodiment of the present disclosure. In one embodiment, sequencer circuit 106 includes a 4-bit counter 202, logic gates 204, 208, a timing register 206, D flip flops 210, 212, and a step transition time controller 201. The 4-bit counter 202 receives a 4 GHz clock signal 214 and at 4 GHz provides 250 picosecond timing intervals over a 4 nsec range. The 4-bit counter 202 generates a counter output signal CNT[3:0] coupled to inputs of logic gates 204, 208. Logic gate 204 generates an output signal 205 coupled to a clock input of D-flip flop 210. The D-flip flop 210 additionally has a data input for receiving a power-on-enable signal $P_{on}$ 216; the $P_{on}$ signal 216 is received from a synchronous 250 MHz logic circuit (not shown herein). D-flip flop 210 generates as its output the first current enable signal 114, which is provided to the main circuit 108 as well as to the data input of another D flip flop 212. Logic gate 208 includes a first input (A) coupled to the output CNT[3:0] of the 4-bit counter 202 and a second input coupled to the output T[3:0] of timing register 206, and generates an output signal 209 coupled to a clock input of D flip flop 212. In addition, D-flip flop 212 receives the first current enable signal 114 as its data input, and generates as its output a second current enable signal 116, which is also provided to the main circuit 108. Step transition time controller 201 receives the measured noise signal 112 from the noise measurement circuit 104, determines the appropriate step transition times (for example, according to methods illustrated with respect to FIG. 5), and stores a value representative of the appropriate step transition time in timing register 206 for output as T[3:0].

In one embodiment, the main circuit 108 includes resistors 230, 232, and n-type MOSFETs (Metal Oxide Semiconductor Field Effect Transistors) 226, 228, 218, 222, 220, 224. Resistor 232 has one end coupled to $V_{PDN}$ 118 and the other end coupled to the drain of an n-channel MOSFET 228. The voltage at the drain of the n-channel MOSFET 228 is outputted from the main circuit 108 as a first output signal 238 of the main circuit and provided to the additional circuit 110. The gate of the n-channel MOSFET 228 receives a first data signal 234 and the source of the MOSFET 228 is coupled to node 242. In addition, resistor 230 has one end coupled to $V_{PDN}$ 118 and the other end coupled to the drain of re-channel MOSFET 226. The voltage at the drain of the n-channel MOSFET 226 is outputted from the main circuit 108 via a second output signal 240 of the main circuit and provided to the additional circuit 110 (FIG. 1). The gate of the n-channel MOSFET 226 receives a second data signal 236 and the source of the n-channel MOSFET 226 is coupled to node 242. Resistors 230 and 232 along with n-channel MOSFETs 226 and 228 form a differential pair 241.

MOSFETs 220, 224 are connected in series to each other, MOSFETs 218, 222 are connected in series to each other, and the MOSFET pair 220, 224 is connected to the MOSFET pair 218, 222 in parallel. The gate of n-channel MOSFET 220 receives the first current enable signal 114 from the sequencer circuit 106. The drain of n-channel MOSFET 220 is coupled to the differential pair 241 at node 242 and the source of n-channel MOSFET 220 is coupled to the drain of n-channel MOSFET 224. The gate of n-channel MOSFET 224 receives a bias voltage ($V_{BIAS}$ 244) and the source of MOSFET 224 is coupled to ground (Vss). The gate of n-channel MOSFET 218 receives the second current enable 116 from the sequencer circuit 106. The drain of n-channel MOSFET 218 is coupled to the node 242 and the source of n-channel MOSFET 218 is coupled to the drain of n-channel MOSFET 222. The gate of n-channel MOSFET 222 receives the bias voltage $V_{BIAS}$ 244 and the source of MOSFET 222 is coupled to ground (Vss). The n-channel MOSFETs 218, 220, 222, and 224 together create the load current 250 for the differential pair 241 described above.

Reference is now made to the components of FIG. 2A described above for discussion of the operation of sequencer circuit 106 and main circuit 108. Counter 202 counts the clock signal 214 and outputs a count CNT[3:0] to logic gate 204. If all four bits of CNT[3:0] are zero (at count zero, or time t=0 (see numeral 309 in FIG. 3), logic gate 204 outputs logic level one 205 to the clock input of D flip flop 210 and maintains it. The logic level one voltage may be for example, about 1.8 volts. Pon signal 216 is at logic level one when PDN 102 is to be switched on. Thus, when the clock input of D flip flop 210 transitions from zero to logic level one responsive to the output signal 205, D-flip flop 210 latches logic level one of Pon signal 216 and outputs logic level one via the first current enable signal 114. The n-channel MOSFET 220 receives the logic level one value of the first current enable signal 114 at its gate, which causes n-channel MOSFET 220 to be turned on.

Further, the logic gate 208 receives count CNT[3:0] from counter 202. The logic gate 208 compares count CNT[3:0] to a value T[3:0] outputted by timing register 206. Such value T[3:0] is a value representative of the second step transition time as determined by the noise measurement circuit 104 and stored in timing register 206, as will be explained in more detail below with reference to FIG. 5. If CNT[3:0] is not equal to T[3:0], logic gate 208 outputs logic level zero 209 to the clock input of D flip flop 212. The logic level zero 209 prevents D flip flop 212 from latching any data input and thus causes D flip flop 212 to output logic level zero to the main circuit 108 via the second current enable signal 116. The n-channel MOSFET 218 receives the logic level zero via the second current enable signal 116 at its gate, which causes n-channel MOSFET 218 to remain off. However, when counter 202 increases its count in response to the clock signal 214 and CNT[3:0] becomes equal to T[3:0], logic gate 208 outputs logic level one 209 to the clock input of D flip flop 212. The logic level one 209 causes D flip flop 212 to latch the data input coupled to the output of D flip flop 210. Since D flip flop 210 already latched and output logic level one when CNT[3:0] was zero, D flip flop 212 latches and outputs logic level one to the main circuit 108 via the second current enable signal 116 when CNT[3:0] becomes equal to T[3:0]. N-channel MOSFET 218 receives the logic level one via the second current enable signal 116 at its gate, which causes n-channel MOSFET 218 to be turned on. It should be noted that n-channel MOSFETs 222 and 224 are always on based on $V_{BIAS}$ 244.

Thus, at the first step transition time 309 (FIG. 3) when CNT[3:0] is zero, MOSFET 220 turns on but MOSFET 218 remains off until the second step transition time 311 (FIG. 3) when CNT[3:0] increases and becomes equal to T[3:0] from timing register 206. When the n-channel MOSFET 220 is turned on and n-channel MOSFET 218 remains off, the first step 307 (FIG. 3) of the load current $I_{LOAD}$ 250 is generated and flows through node 242, n-channel MOSFET 220, and n-channel MOSFET 224. No current flows through n-channel MOSFET 218 since it is off.

At the second step transition time 311 (FIG. 3) when CNT [3:0] becomes equal to T[3:0], MOSFET 220 remains on and MOSFET 218 is also switched on. Since both MOSFETS 220, 218 are on, the second step 305 (FIG. 3) of load current $I_{LOAD}$ 250 is generated.

Thus, the value T[3:0] stored in and output from timing register 206 determines at which counter cycle of counter 202 the second current enable signal 116 is switched from logic level zero to logic level one during turn on (or from logic level one to logic level zero during turn off), which is representative of the second step transition time 311 (FIG. 3). In one embodiment, the step sizes of the first step and second step may be controlled by the size of n-channel MOSFETs 218, 220, 222, and 224. For example, if the sizes of n-channel MOSFETs 218, 220, 222, and 224 are the same, the step size of the first step increase 307 (FIG. 3) and the second step increase 305 (FIG. 3) in the load current $I_{LOAD}$ 250 is same. In other embodiments, the sizes of the MOSFETs 220, 224 may be different from the sizes of MOSFETs 218, 222, so that the step sizes 307, 305 may be configured to be different.

Based on the load current $I_{LOAD}$ 250 through node 242 and the voltage values of the first data signal 234 and the second data signal 236, the differential pair 241 outputs specific voltage values via the first output signal 238 and the second output signal 240, which are received by the additional circuit 110. In one embodiment, the main circuit 108 is a memory controller and its first output signal 238 and second output signal 240 are received by the additional circuit 110, which may be a dynamic random access memory (DRAM) or any other type of memory device.

After main circuit 108 is turned on, it can be turned off at a later time in a similar manner by lowering Pon signal 216 to a zero value. As described above, D flip flop 210 will latch the zero value of Pon and thus set the first current enable signal 114 to zero when all of the bits of CNT[3:0] are equal to zero. Later, when CNT[3:0] is equal to T[3:0], D flip flop 212 will latch the zero value of the first current enable signal 114 and thus set the second current enable signal 116 to zero.

Figure 2B:
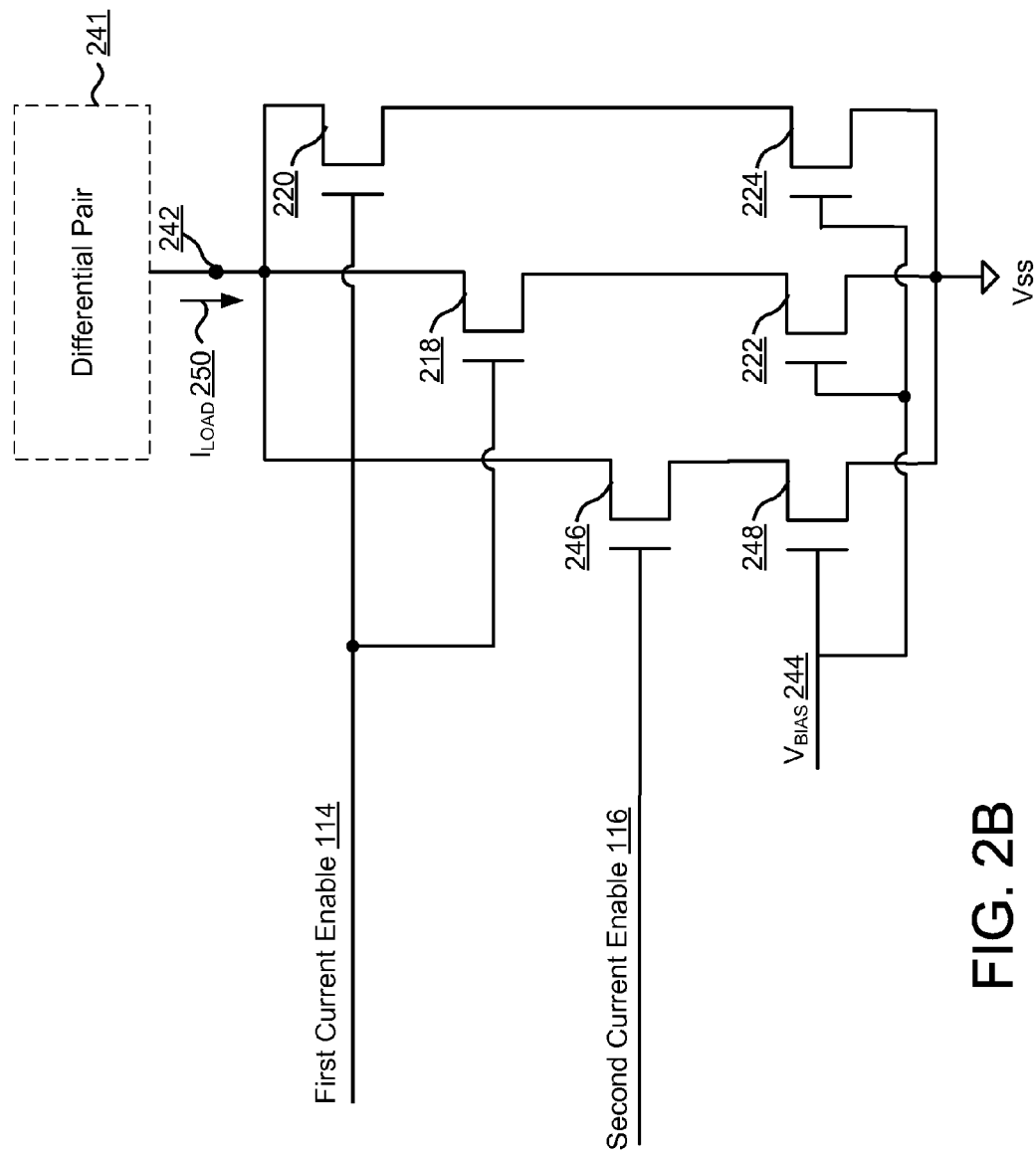
FIG. 2B is a schematic illustrating the main circuit shown in FIG. 1 in more detail, according to an alternate embodiment of the present disclosure.

FIG. 2B is a schematic illustrating the main circuit 108 shown in FIG. 1 in more detail, according to an alternate embodiment of the present disclosure. FIG. 2B shows an example of how the step sizes of the first step 307 (FIG. 3) and the second step 305 (FIG. 3) of the load current $I_{LOAD}$ 250 can be controlled by adding additional pairs of n-channel MOSFETs. As can be seen in FIG. 2B, the circuitry remains the same as that of FIG. 2A, except that in FIG. 2B n-channel MOSFETs 246 and 248 are added to the main circuit 108 and that the first current enable signal 114 also controls MOSFETs 218, 222. The gate of the n-channel MOSFET 246 receives the second current enable 116 signal and its drain is coupled to node 242. The source of n-channel MOSFET 246 is coupled to the drain of re-channel MOSFET 248. The gate of n-channel MOSFET 248 is coupled to $V_{BIAS}$ 244 and the source of MOSFET 248 is coupled to ground (Vss).

While MOSFETs 220 and 218 receive logic level one via the first current enable signal 114 and the n-channel MOSFET 246 receives logic level zero via the second current enable signal 116, MOSFETs 220 and 218 are turned on which generates the first step 307 (FIG. 3) of the load current 250 but MOSFET 246 is turned off. At the second step transition time 311 (FIG. 3), the second current enable signal 116 switches from logic level zero to logic level one, and thus MOSFET 246 also turn on, which results in the second step of the load current 250 being generated. In the embodiment of FIG. 2B, the step size of the first step is greater than that of the second step, since two pairs of MOSFETs 220, 224 and 218, 222 generate additional current at the second step transition time. For example, if all n-channel MOSFETs 220, 224, 218, 220, 246, 248 are of the same size, the first step size 307 is double the second step size 305 and the load current 250 after the first step transition may be ⅔ of the load current 250 after the second step transition. Therefore, the embodiment of FIG.

2B provides more flexibility and the ability to control the step size of the step transitions in the load current 250 in addition to their step transition times.

Figure 2C:
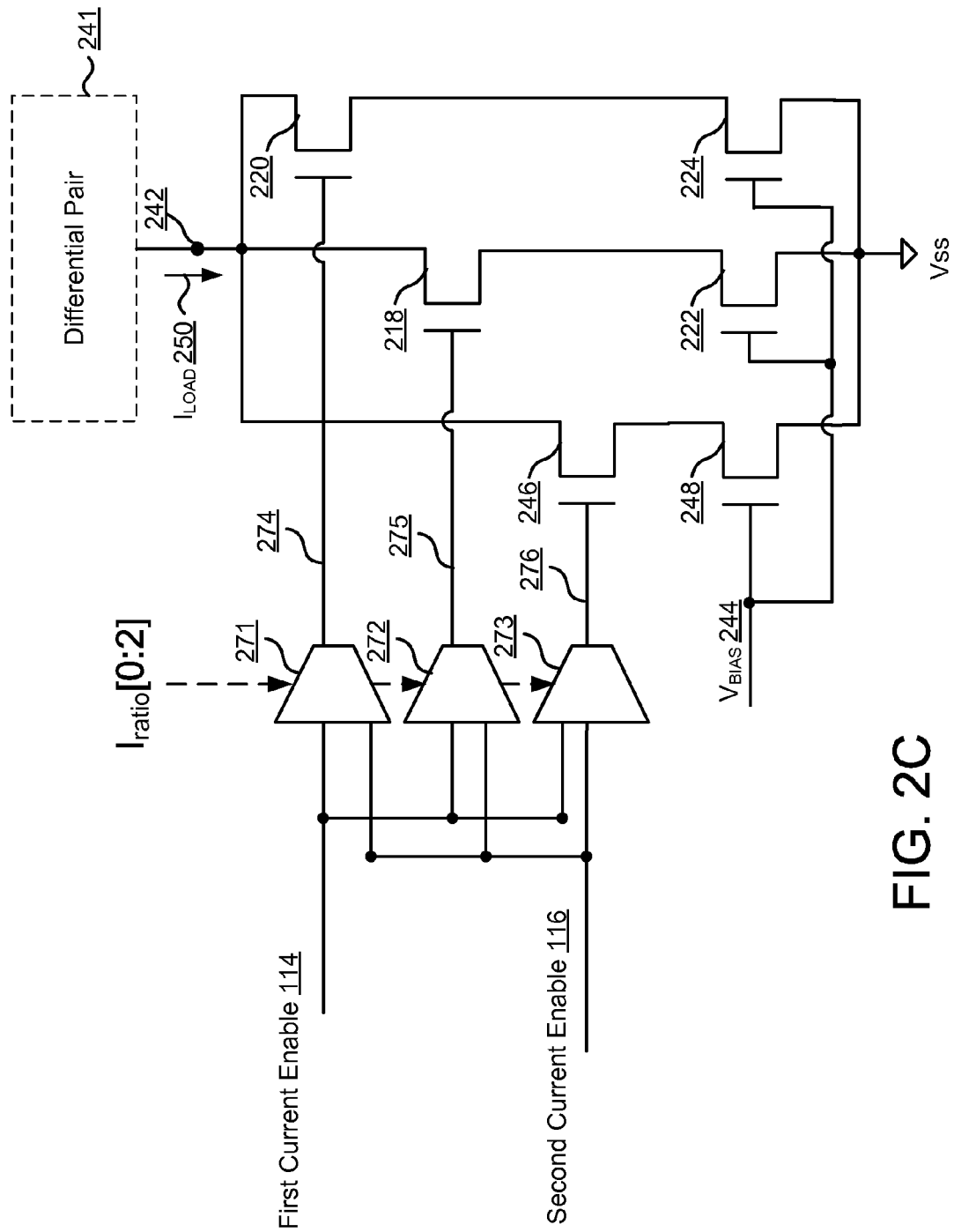
FIG. 2C is a schematic illustrating the main circuit shown in FIG. 1 in more detail, according to a still alternate embodiment of the present disclosure.

FIG. 2C is a schematic illustrating the main circuit shown in FIG. 1 in more detail, according to a still alternate embodiment of the present disclosure. As can be seen in FIG. 2C, the circuitry remains the same as that of FIG. 2A, except that in FIG. 2C the MOSFETs 220, 218, 246 are controlled by the outputs 274, 275, 276 of multiplexers 271, 272, 273, respectively. Each multiplexer 271, 272, 273 receives both the first current enable signal 114 and the second current enable signal 116 as its input and selects and outputs one of them in response to a 3-bit selection signal $I_{ratio}[0:2]$. Each bit of $I_{ratio}[0:2]$ controls its corresponding multiplexer 271, 272, 273, i.e., bit 0 of $I_{ratio}[0:2]$ controls multiplexer 271, bit 1 of $I_{ratio}[0:2]$ controls multiplexer 272, and bit 2 of $I_{ratio[0:2]}$ controls multiplexer 273. Each multiplexer 271, 272, 273 is configured to select, for example, the first current enable signal 114 when the corresponding bit of $I_{ratio}[0:2]$ is logic level zero and the second current enable signal 116 when the corresponding bit of $I_{ratio}[0:2]$ is logic level one. Thus, the embodiment of FIG. 2C has the advantage that the step size of the transient load current 250 may be controlled dynamically in a versatile manner by setting $I_{ratio[0:2]}$ to an appropriate value according to the desired transient load current 250.

Figure 2D:
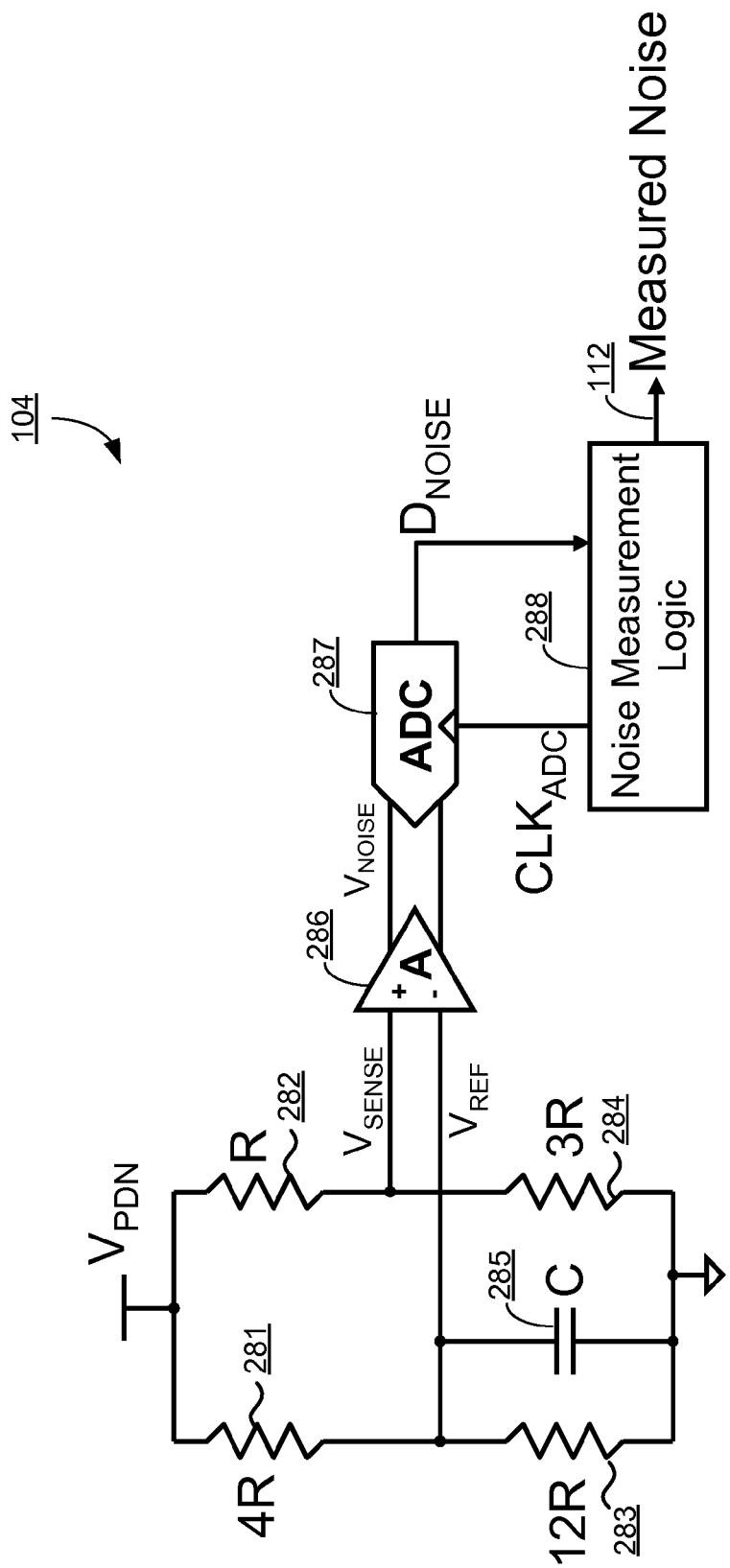
FIG. 2D is a schematic illustrating the noise measurement circuit shown in FIG. 1 in more detail, according to one embodiment of the present disclosure.

FIG. 2D is a schematic illustrating the noise measurement circuit shown in FIG. 1 in more detail, according to one embodiment of the present disclosure. Noise measurement circuit 104 directly measures the noise on PDN 102. In other embodiments, noise measurement circuit may considers other inputs, such as a performance indicators of the main circuit powered by the PDN to determine the noise on the PDN 102, as will be explained in more detail below with reference to FIGS. 8A, 8B, and 11.

Referring to FIG. 2D, resistors 281, 283 of resistance values 4R and 12R, respectively, in combination with capacitor 285 of capacitance value C, form a voltage divider and low pass filter that derive a signal $V_{REF}$ from the power distribution network voltage $V_{PDN}$. $V_{REF}$ has a nominal value of $0.75 \times V_{PDN}$, and the low pass filter effectively rejects any high frequency noise on $V_{PDN}$. The filter cutoff frequency $f_{cutoff}=1/(6\pi RC)$ is designed to be significantly lower than any possible resonant frequency in the power distribution network 102. Thus, any noise in $V_{PDN}$ associated with power distribution network resonance does not appear at $V_{REF}$. Resistors 282, 284 of resistance values R and 3R form another voltage divider to derive a signal $V_{SENSE}$ from $V_{PDN}$. $V_{SENSE}$ has a nominal value of $0.75 \times V_{PDN}$, and is designed such that high frequency noise on $V_{PDN}$, such as noise associated with power distribution network resonance, is transferred to $V_{SENSE}$, although multiplied by 0.75. Thus, the voltage difference between $V_{SENSE}$ and $V_{REF}$ is equal to the high frequency noise voltage on $V_{PDN}$, such as that associated with power distribution network resonance.

The voltage difference between $V_{SENSE}$ and $V_{REF}$ is differentially amplified by amplifier 286 to generate differential signal $V_{NOISE}$, which is then sampled by analog-to-digital converter (ADC) 287 to produce a sampled supply noise signal $D_{NOISE}$. $D_{NOISE}$ is thus a digital representation of the high frequency supply noise on $V_{PDN}$, scaled by the resistor voltage dividers, amplifier gain A, and the voltage conversion scale of ADC 287. The amplifier 286 may be useful to increase the amplitude of the measured supply noise prior to sampling by ADC 287 in order to reduce the required resolution of ADC 287. The ADC sample rate, governed by its sampling clock $CLK_{ADC}$, is more than twice the maximum expected power distribution network resonant frequency to ensure that any resonant supply noise will be captured in $D_{NOISE}$.

Noise measurement logic 288 monitors the sampled noise signal $D_{NOISE}$ to produce the measured noise signal 112. In one embodiment, measured noise 112 may be calculated as the difference between the minimum and maximum values out of the most recent N samples of $D_{NOISE}$, where N is chosen large enough so that the N most recent samples span a time period longer than the longest expected supply resonance period.

Figure 4:
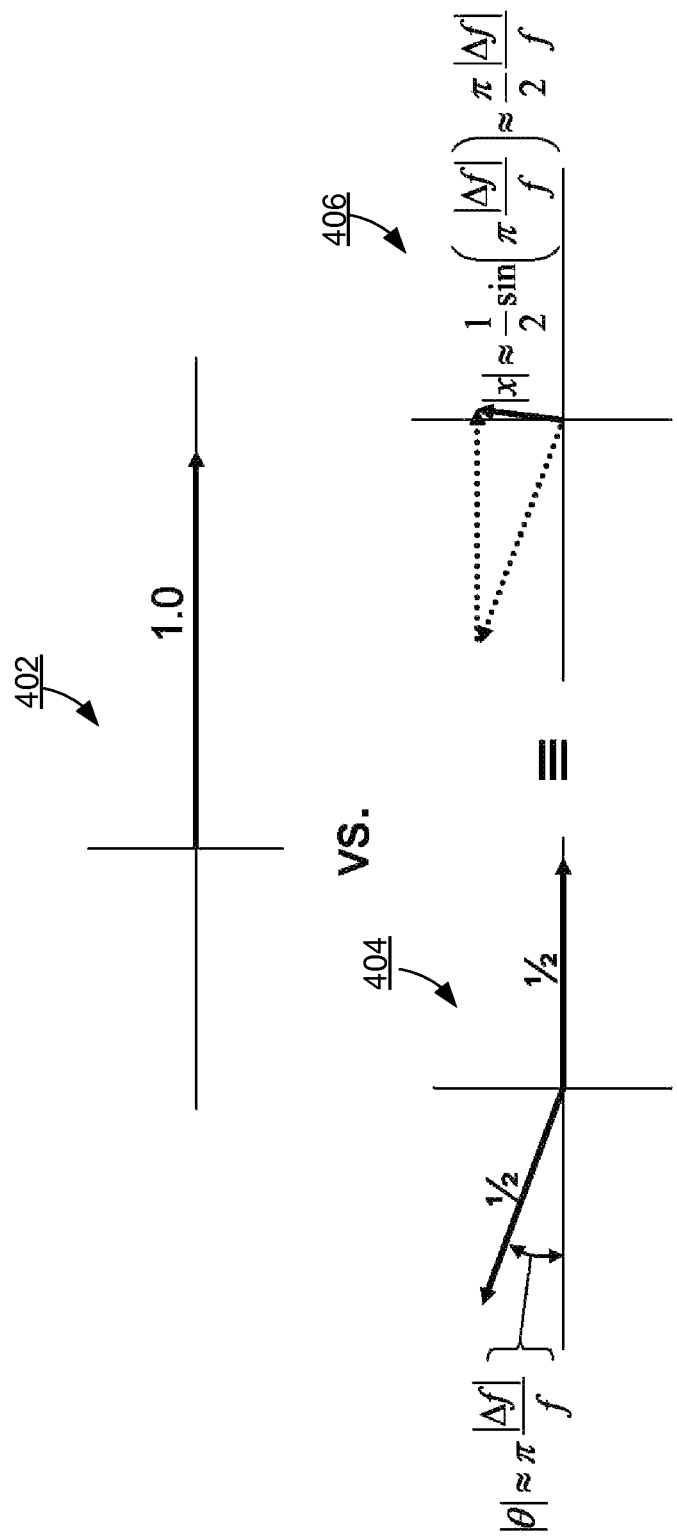
FIG. 4 illustrates phasor diagram analysis of the voltage response of a $2^{nd}$ order PDN when a step increase of the load current is not timed correctly relative to the resonant frequency of the PDN.

FIG. 4 illustrates a phasor diagram analysis of the voltage response of a $2^{nd}$ order PDN when a step is not timed correctly relative to the resonant frequency of the PDN. If the step transition is not timed appropriate relative to the resonant frequency of the PDN 102, significant resonance will still exist in the supply current $I_{PDN}$ 122 even if the transient load current $I_{LOAD}$ 250 is increased in multiple steps. Referring to FIG. 4, phasor diagram 402 illustrates phasor analysis for one-step load current 302 as shown in FIG. 3. As can be seen, phasor diagram 402 is not rotationally symmetric for the one-step load current 302, and as a result resonance exists in supply current $I_{PDN}$ 122 and supply voltage $V_{PDN}$ 118. The phase vector in phasor response 402 has been normalized to unit amplitude and zero phase for comparison purposes. Phasor diagrams 404 and 406 illustrate phasor analysis for two-step load current, 304 shown in FIG. 3, where the second step transition time 311 is not timed appropriately relative to the resonant frequency (period) of the PDN 102. The two phase vectors in phasor diagram 404 each have magnitudes of 0.5 because they are generated by transient current steps one half the size of the current step in the one-step method. Because the second step transition time is not timed appropriately relative to the resonant frequency of the PDN 102 (it is not at phase angle π relative to the PDN resonance), phasor diagram 404 is not rotationally symmetrical and as a result oscillation still exists in the supply current $I_{PDN}$ 122 and voltage $V_{PDN}$ 118 even if the transient load current $I_{LOAD}$ 250 is increased in multiple steps. The phase angle error $|\theta|$ in the second vector is shown to be proportional to the ratio of the frequency (or timing) error $\Delta f$ to the actual resonance frequency f. However, since the tones are close to being symmetrical there will be less oscillation in the supply current $I_{PDN}$ 122 than in the one-step load current situation 402. Phasor diagram 406 shows that the amplitude of the final oscillation can be determined. The dashed phase vectors in phasor diagram 406 are the same phase vectors from diagram 404, but translated in a "head-to-toe" manner to show their vector sum, represented by the solid vector in phasor diagram 406. The amplitude of the resonance is approximately $(\pi/2)*(|\Delta f|/f)$, where $\Delta f$ is the error in resonant frequency estimation and f is the resonant frequency of the PDN 102. For example, a 10% error in the estimation of the resonant frequency will result in the amplitude of the resonance being about 16% of the resonance of a single step load current 402.

Referring back to FIG. 1, in one embodiment, the optimal step transition time for each step transition of the transient load current $I_{LOAD}$ 250 is determined relative to the resonant frequency of the PDN 102 by the noise measurement circuit 104 measuring the resonant period of voltage $V_{PDN}$ 108 at node 120 (FIG. 1). Sequencer circuit 106 receives the measured resonant period via the measured noise signal 112. In one embodiment the sequencer circuit 106 (specifically, step transition time controller 201 in FIG. 2A) determines the appropriate step transition time to be equal to $T_{PDN}/N$, where $T_{PDN}$ is the resonant period of PDN 102 resonant period and N is number of steps of increases in the load current 250 to be used. For example, if the resonant period of the PDN is measured to be 14 nsecs and the load current 250 will be increased in three steps. the sequencer circuit 106 will step the load current approximately every 4.6 nsecs (14/3 nsecs) in order to cancel out all resonance in the supply current 122 provided by the PDN 102.

Figure 5:
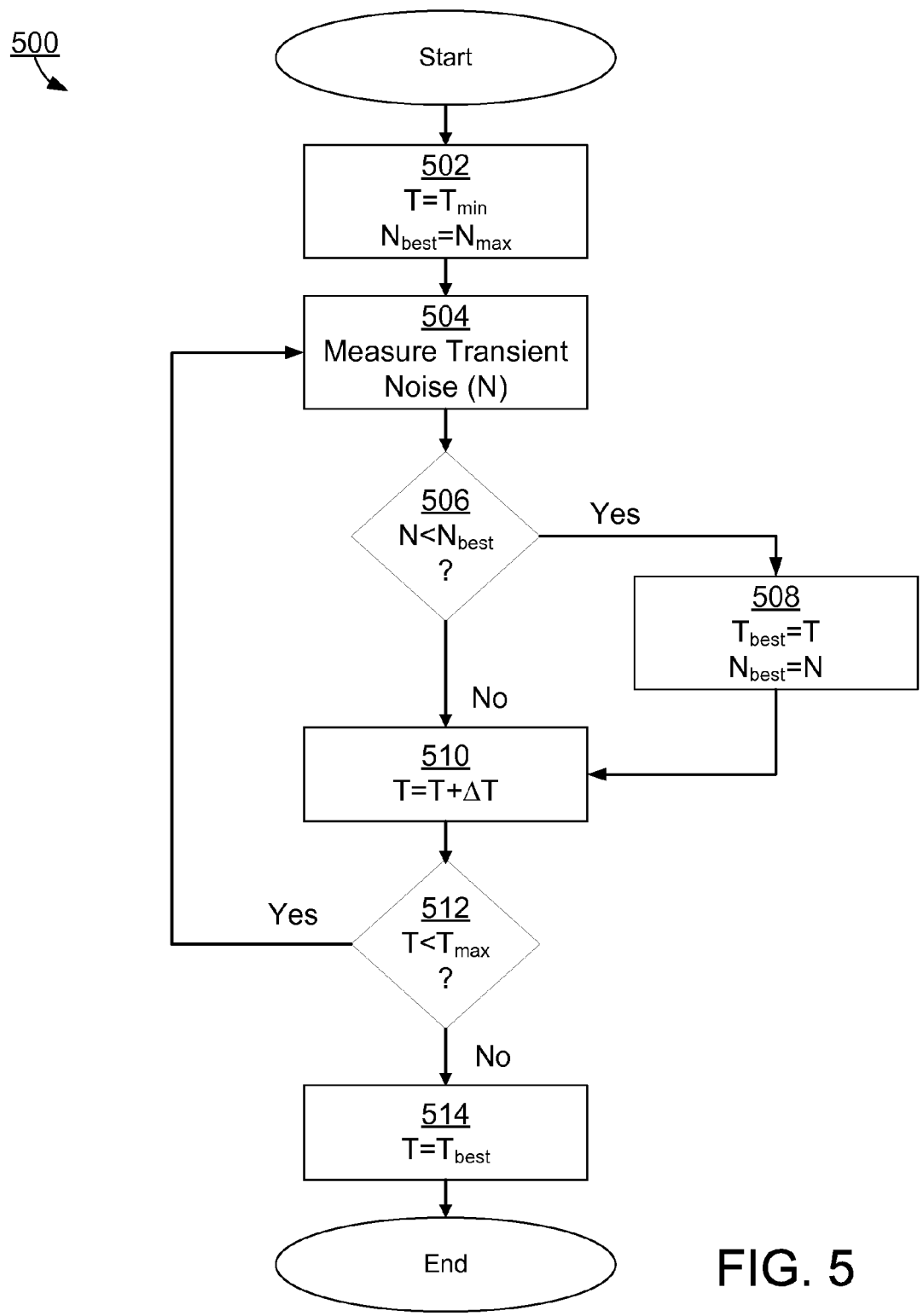
FIG. 5 is a flow chart illustrating a process for determining the optimal step transition times of a two-step load current, according to one embodiment of the present disclosure.

FIG. 5 is a flow chart illustrating a process for determining optimal step transition times of a two-step load current, according to one embodiment of the present disclosure. In one embodiment, the process of FIG. 5 is carried out by step transition time controller 201 to obtain the appropriate step transition times and store them in timing register 206, in response to measured PDN noise amplitude conveyed by measure noise signal 112. If the load current is increased in two steps and the first step transition occurs at a given first step transition time, the optimal second step transition time relative to or after the first step transition time is determined by measuring the noise amplitude at $V_{PDN}$ 118 after the second step transition while sweeping through a range of possible second step transition times (by increasing or decreasing the step transition times) and selecting the step transition time that causes the least amount of noise in $V_{PDN}$ 118 to be the second step transition time. The process 500 begins by setting 502 a second step transition time T (relative to or after the first step transition time) equal to a minimum second step transition time $T_{min}$. $T_{min}$ is the smallest possible value the second step transition time could be (e.g., zero seconds) relative to or after the first step transition time. Additionally, the best determined noise $N_{best}$ is set 504 equal to a maximum possible noise value $N_{max}$. $N_{best}$ is the least amount of noise that has been produced by a second step transition time, and ideally at the end of the process $N_{best}$ is as close to zero as possible. In one embodiment, $N_{max}$ is the noise measured during a one-step load current (e.g., 302 in FIG. 3). The load current 250 is increased from the first step to the second step at time T (relative to or after the first step transition time) and the noise measurement circuit 104 measures 504 the transient noise amplitude N of $V_{PDN}$ 118 and transmits the measured noise N to the sequencer circuit 106 via the measured noise signal 112.

The sequencer circuit 106 (step transition time controller 201) receives the measured noise N and compares 506 it to $N_{best}$. If N is less than $N_{best}$ in step 506, it means that generating the second step of the load current 250 at time T (relative to or after the first step transition time) has produced the least amount of noise out of all the times previously tested. In step 508 the step transition time controller 201 sets the best second step transition time $T_{best}$ (relative to or after the first step transition time) to be equal to the current value of T and $N_{best}$ is set equal to N. In other words, $T_{best}$ is set equal to a second step transition time (relative to or after the first step transition time) that has produced the least amount of noise, which is $N_{best}$. On the other hand, if N is not less than $N_{best}$ in step 506, the T is increased 510 by $\Delta T$. $\Delta T$ is the time value by which T is incremented in each iteration of the process of FIG. 5.

In step 512 the sequencer circuit 106 compares T to $T_{max}$, which is the maximum second step transition time (relative to or after the first step transition time) for which noise should be measured. If T is less than $T_{max}$ in step 512, steps 504 through 512 are repeated. On the other hand, if T is not less than $T_{max}$ in step 512, T is set 514 equal to $T_{best}$ and the process 500 is complete. The step transition time controller 201 sets the determined T in step 514 to be the second step transition time (relative to or after the first step transition time) of the load current 250 and stores it in timing register 206. This determined value T is represented as the digital value T[3:0] from timing register 206. The process 500 allows the sequencer circuit 106 to determine and use a second step transition time that will produce the lowest possible noise in the PDN voltage $V_{PDN}$ 118. For two-step load current that increases load current 122 in two steps, the T value determined in step 514 by process 500 should be close to half the resonant period of PDN 102. It should be noted that if a load current has more than two step increases, a similar process can be performed to find the optimal step transition time.

In one embodiment, process 500 is performed periodically during a calibration phase when circuitry 100 is not in normal operation. In another embodiment, a similar procedure may continuously adjust the sequencer timing dynamically when circuitry 100 is in operation. In this other embodiment, process 500 is optionally performed during an initial calibration phase. However, because process 500 requires the second step transition time T to be set to an extreme value $T_{min}$ in step 502, it is not suitable for use during normal circuit operation. Instead, a gradient descent procedure may be used to continuously refine the second step transition time near the optimal value T. In a gradient descent procedure, the second step transition time T is periodically adjusted by a small positive or negative test offset, and the transient supply noise is measured again at the next power supply sequencing operation. Depending on the result of the supply noise measurement (whether it is larger or smaller than a previous measurement at sequencer timing T), the timing adjustment is either accepted or rejected. If the timing adjustment was rejected, the next test offset to the sequencer timing may be in the opposite direction. If the timing adjustment was accepted, the next test offset to the sequencer timing may be in the same direction. In the final steady state, this process will result in the second step transition time T that dithers among two or more timing values near the optimal value that results in the minimum amount of supply noise. The test timing offsets are chosen to be small enough that the resulting dither around the optimal second step transition time T will not be large enough to degrade the performance of the main circuit 108 below some tolerable limit. In another embodiment, process 500 is performed once, possibly predetermined during manufacturing testing and the determined step transition time is programmed into the timing register 206 of the sequencer circuit 106.

Figure 6:
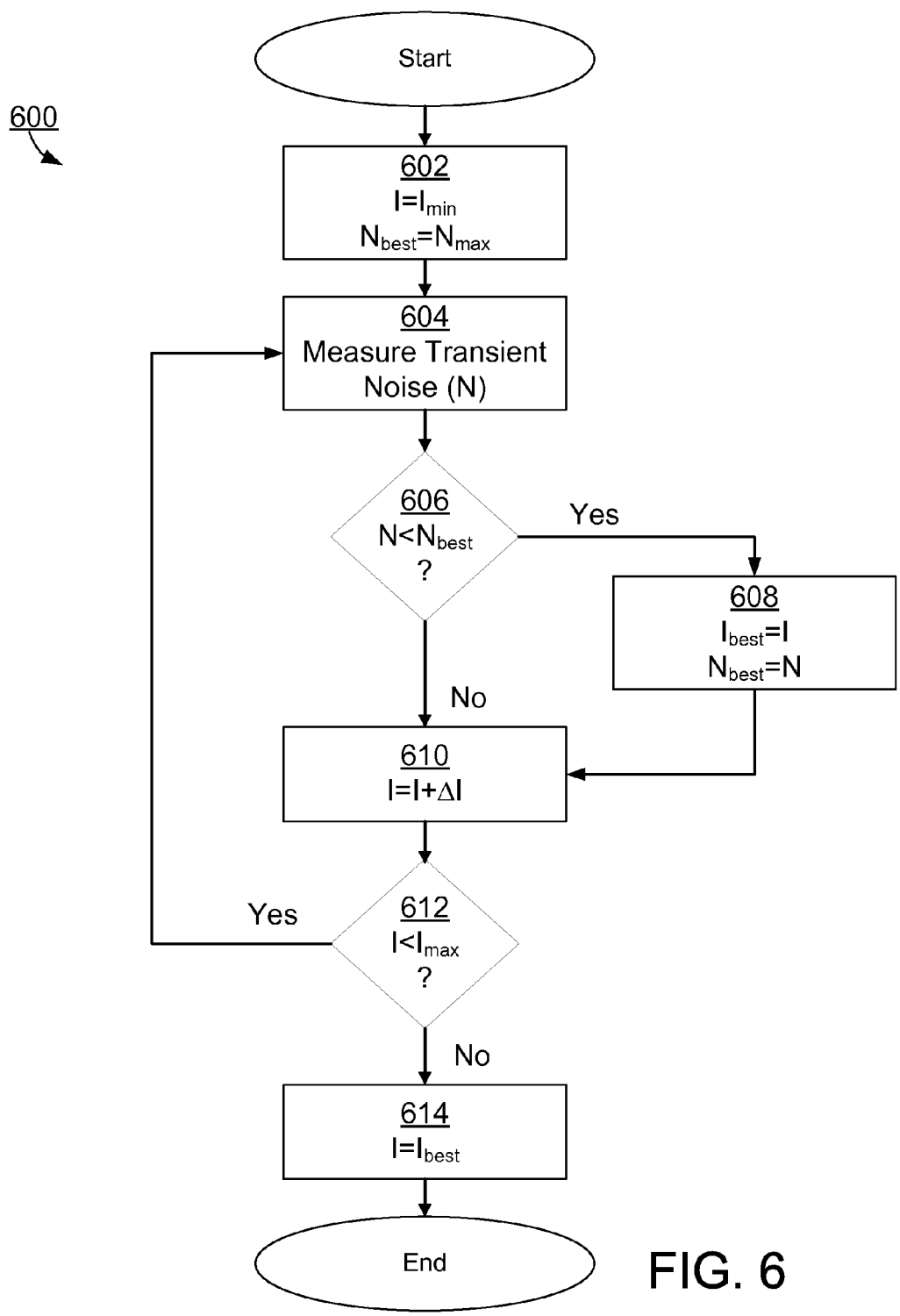
FIG. 6 is a flow chart illustrating a process for determining the optimal first step size for the load current, according to one embodiment of the present disclosure.

FIG. 6 is a flow chart illustrating a process 600 for determining the optimal first step size for the load current, according to one embodiment of the present disclosure. The optimal first step size (e.g., step size 307 in FIG. 3) is determined by measuring the noise amplitude at $V_{PDN}$ 118 through a range of first step sizes and selecting the first step size that produces the least amount of noise in $V_{PDN}$ 118. The process 600 begins by setting 602 a first step size I equal to a minimum first step size $I_{min}$. $I_{min}$ is the smallest possible value the first step size could be (e.g., 0 mA). In addition, the best determined noise $N_{best}$ is set equal to a maximum noise value $N_{max}$. In one embodiment, $N_{max}$ is the noise measured during a one-step load current (e.g., 302 in FIG. 3). The load current 250 is increased in two steps using I for the first step size 307. At a second step transition time 311 (FIG. 3), the second step of the load current is generated with a second step size. The second step size (e.g., 305 in FIG. 3) is equal to the difference between the final, desired load current 250 and the first step size 307.

Once the second step of the load current 250 is generated, the transient noise N at $V_{PDN}$ 118 is measured 604 and is compared 606 to $N_{best}$. If N is less than $N_{best}$, in step 608 a best first step current size parameter $I_{best}$ is set equal to I and $N_{best}$ is set equal to N. In other words, $I_{best}$ is set to a first step size 307 that has produced the least amount of noise in the supply voltage 118 up to that point in the process 600. Alternatively, if N is not less than $N_{best}$ in step 606, I is increased 610 by ΔI, which is a predetermined value by which I is incremented in each iteration of the process 600.

Then in step 612, I is compared to $I_{max}$, which is the maximum first step size for which noise should be measured. If I is less than $I_{max}$ in step 612, steps 604 through 612 are repeated. Alternatively, if I is not less than $I_{max}$ in step 612, I is set 614 equal to $I_{best}$ and process 600 is complete. In one embodiment, process 600 is performed during manufacturing testing and the main circuit 108 is configured to generate load current 250 with the determined first step size 307.

In another embodiment, the second step size 305 is determined by scaling the second step according to how much the resonance in the supply current 120 has already decayed from the first step increase. In one embodiment, the second step size $I_{Step2}$ (305 in FIG. 3) is equal to $I_{Step1} \times e^{(-\pi/(2 \times Q))}$, where $I_{Step1}$ is the first step size (307 in FIG. 3) and Q is the Q factor of the PDN 102. In one embodiment the Q factor of the PDN 102 is estimated based on the known design of the PDN 102. In another embodiment, the Q factor is characterized with the assistance of external test equipment after manufacture and recorded in a non-volatile storage cell such as an EEPROM or electrical fuse. In still another embodiment, the Q factor for a batch of devices is similarly characterized after manufacture, and the mean measurement is saved in a non-volatile storage cell or in software (e.g., system boot software) that will later program the value into a volatile register.

Figure 7:
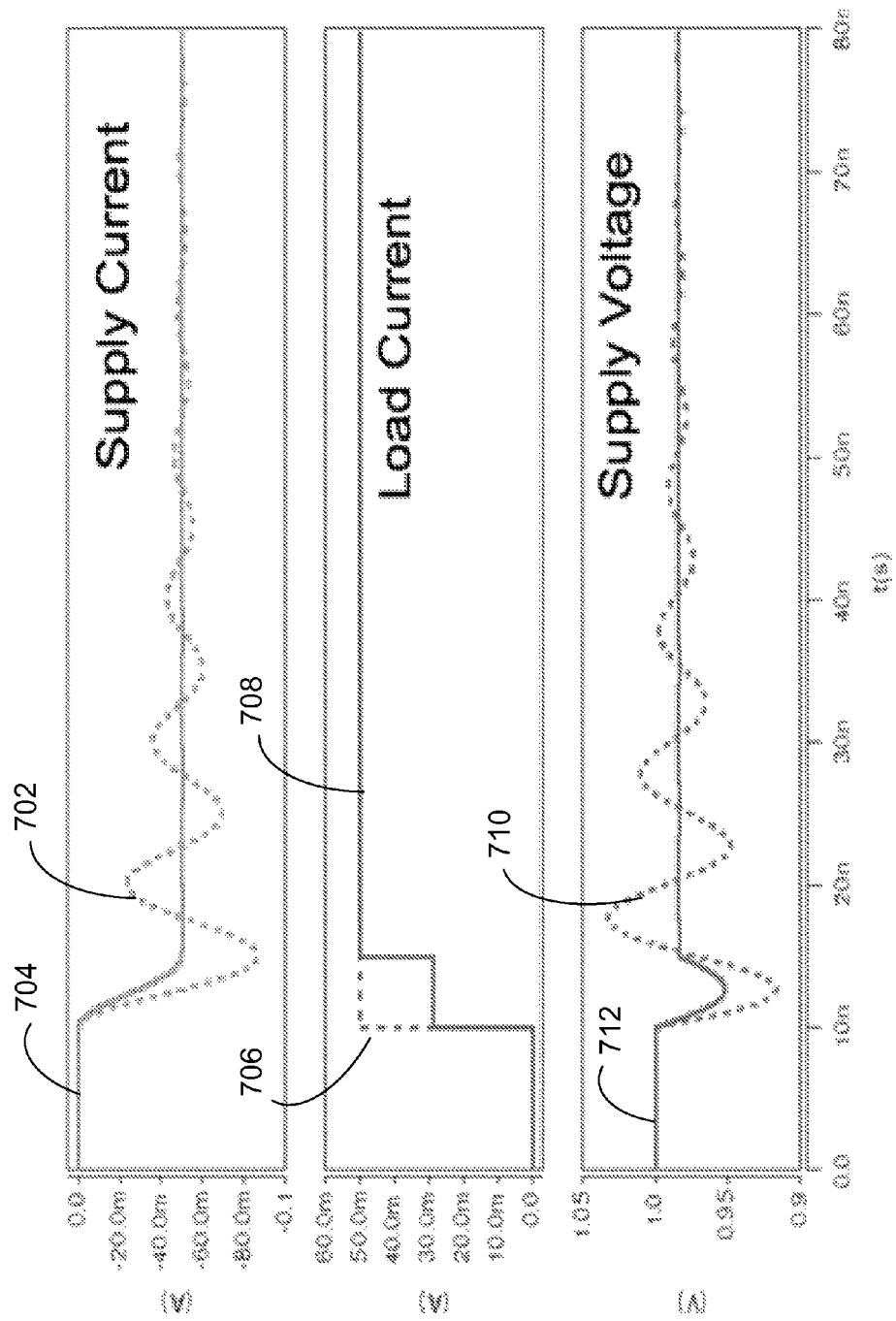
FIG. 7 illustrates a comparison between a second order PDN with a one-step load current and a two-step load current with optimal step sizes.

FIG. 7 illustrates a comparison between a second order PDN having a finite Q factor with a one-step load current and a two-step load current with optimal step sizes. The dashed lines 702, 706, 710 in FIG. 7 represent the supply current, load current, and supply voltage, respectively, in the case of a one-step load current (e.g., 302 in FIG. 3) and the solid lines 704, 708, 712 represent the supply current, load current, and supply voltage, respectively, in the case of a two-step load current (e.g., 304 in FIG. 3). The two-step load current 708 has a first step size 307 of approximately 30 mA, a second step size 305 of approximately 20 mA, a first step transition time 309 at approximately 10 ns and a second step transition time 311 at approximately 15 nsec. The one-step load current 706 has a single step size of approximately 50 mA. As shown in FIG. 7, the two step load current 708 according to embodiments of the present disclosure generates little resonance in the supply current 704 and the supply voltage 712. On the other hand, the one-step load current 706 causes significant resonance in the supply current 702 and the supply voltage 710 of the PDN 102 well after the first step increase of the load current 250.

Figure 8A:
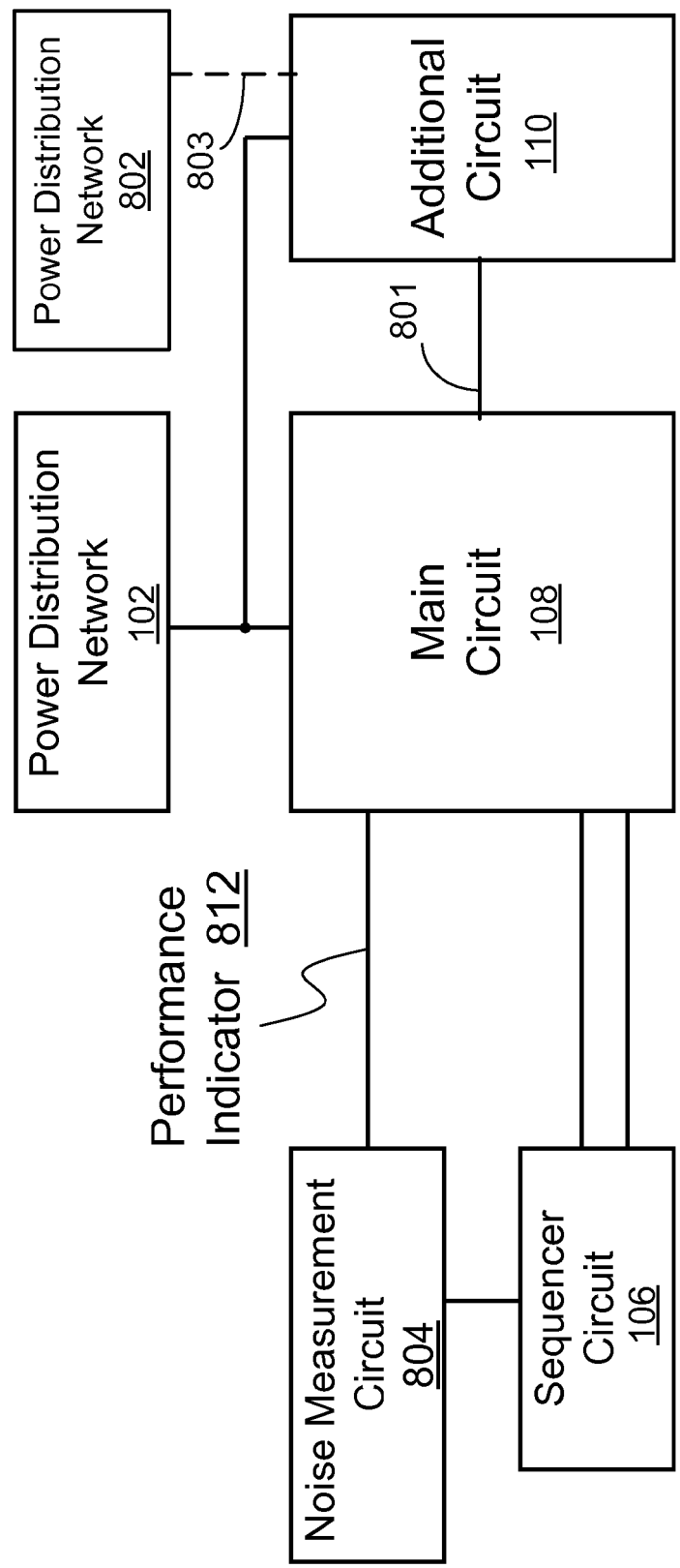
FIG. 8A is a block diagram illustrating a PDN powering connected circuitry, according to an alternative embodiment of the present disclosure.

FIG. 8A is a block diagram illustrating a PDN powering connected circuitry, according to an alternative embodiment of the present disclosure. The embodiment of FIG. 8A is similar to FIG. 1, except that noise measurement circuit 804 receives a performance indicator 812 from the main circuit 808 to infer the noise in the power distribution network 802. The performance indicator 812 represents a certain property of the main circuit operation that is sensitive to the supply voltage noise from PDN 102. Examples of the performance indicator 812 include the ability of a logic circuit to operate correctly at given clock speed, and the measured jitter or bit error ratio (BER) in a bi-directional communication link immediately after turn around in communication direction. In so much as performance indicator 812 depends on noise on $V_{PDN}$, its value may be used by noise measurement circuit 804 and sequencer circuit 806 as a basis for adjusting the step transition timings and relative step sizes of the transient load current 250 in order to reduce resonant supply noise (or to reduce its impact on a desired aspect of the main circuit performance). In yet other embodiments the noise measurement circuit 804 may consider inputs from additional circuits, such as additional circuit 110 in FIG. 8A, that are powered from the same power distribution network 102 as the main circuit 108.

In still other embodiments, the additional circuit 110 may be powered 803 by a separate power distribution network 802. In the case of power cycling or turnaround on signal buses between two or more chips or circuits, current flows between the two chips via the PDNs 102, 802 and the signal lines 801 which may have different resonant frequencies and have some signal flight time between them. In some cases, the PDN powering one of the two chips or circuits 108, 110 may be the primary performance limiter. In these cases, input/output circuits on both chips can adjust the step transition times of their load current to substantially match the resonant frequency of the limiting PDN, in which case the parasitic ringing of the non-dominant PDN will suffer. Still, the ringing on the non-dominant PDN will not be worse than the ringing that would exist on the dominant PDN if a single transient load current step had been used.

Figure 8B:
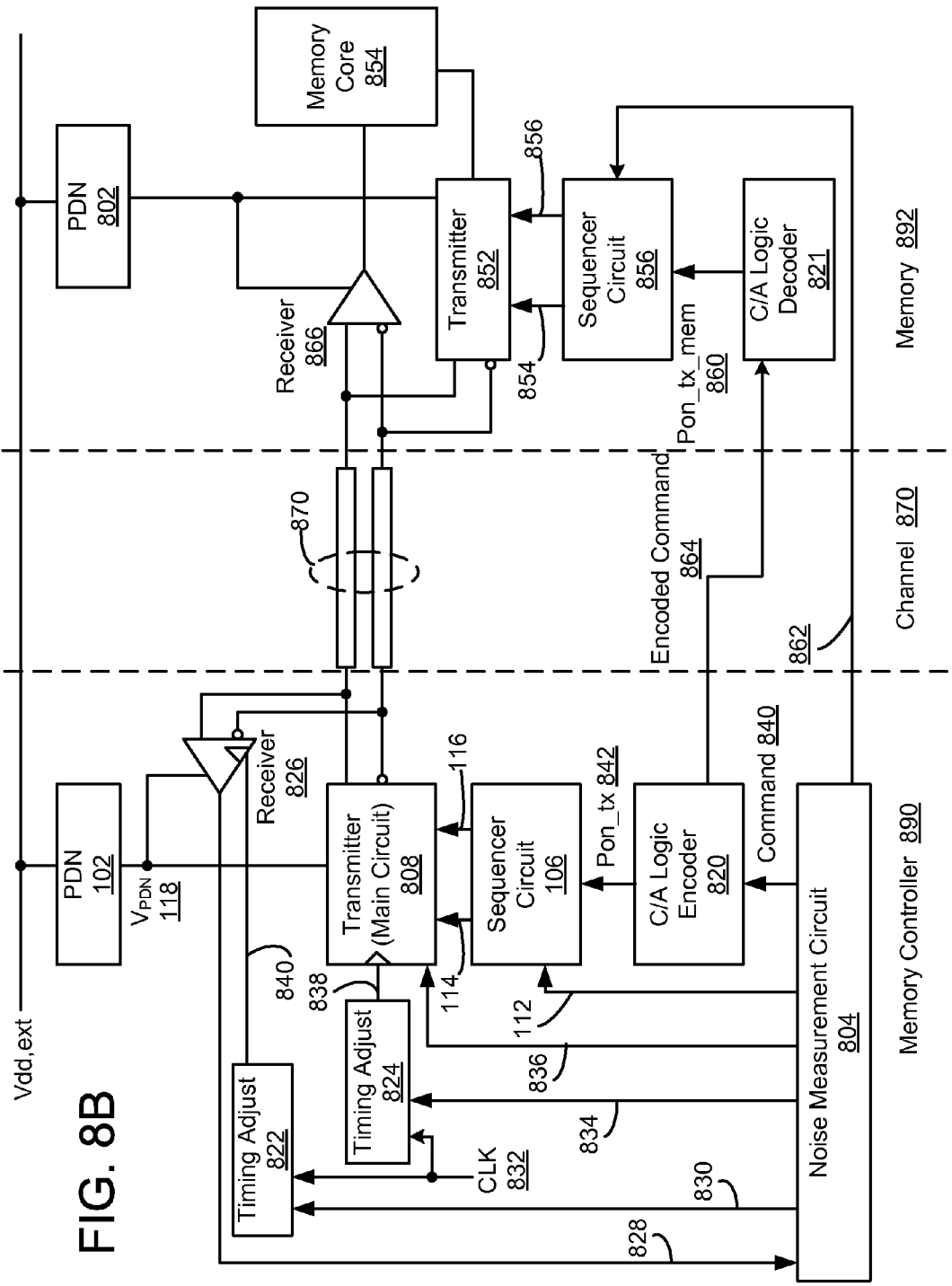
FIG. 8B is a block diagram illustrating two separate PDNs powering a memory controller and a memory device, respectively, according to an alternative embodiment of the present disclosure.

In other embodiments, if adaptive step timing is used, each chip may sweep its timing parameter to find the step transition times that optimize the performance of both chips, taking into account the effects of both PDNs on both chips. The performance indicator 812 may inherently measure the performances of both circuit 108, 110, but yet be measured at one of the circuits (e.g., main circuit 108). Such performance indicator 812 may be used to adjust the step transition timings, resulting in optimal step transition times considering the effects of both power distribution networks 102, 802 powering the main circuit 108 and the additional circuit 110, respectively. FIG. 8B illustrates such embodiment, illustrating two separate PDNs powering a memory controller and a memory device, respectively, according to an alternative embodiment of the present disclosure.

The embodiment of FIG. 8B illustrates a memory controller 890, a memory device 892, and a communication channel 870 between memory controller 890 and memory device 892. Memory controller 890 includes a transmitter 808, sequencer circuit 106, C/A (Control/Address) logic encoder 820, noise measurement circuit 804, timing adjust circuits 822, 824, a receiver 826, and a PDN 102. The memory 892 includes a memory core 854 (including memory cells), a C/A logic decoder 821, a sequencer circuit 856, a transmitter 852, a receiver 866, and a PDN 802 separate from PDN 102. Both PDNs 102, 802 are powered by a common external supply voltage Vdd,ext. The transmitter 808—receiver 866 pair communicates via communication channel 870, and the transmitter 852—receiver 826 pair also communicates via the communication channel 870.

The noise measurement circuit 804 determines the noise caused by both PDNs 102, 802 in both the memory controller 890 and memory 892 by (i) writing data (tx_data 836) to the memory 892 (memory core 854) via the transmitter 808—receiver 866 pair with time-delays 838 introduced by the timing adjust circuit 824 to clock signal CLK 832 of the transmitter 808 within the timing margin of the transmitter 808, reading back the data (rx_data 828) from the memory 892 (memory core 854) via the transmitter 852—receiver 826 pair, and determining the bit error ratio of the previous write by comparing the write data (tx_data 836) and read data (rx_data 828). Likewise, the noise measurement circuit 804 may also introduce time delays 840 to the clock signal CLK 832 of the receiver 826 using timing adjust circuit 822 to introduce delay in the timing margin of the receiver 826 in a similar manner. Noise measurement circuit 804 also sends write/read commands 840 to the C/A logic encoder 820. C/A logic encoder 820 generates control/address commands, such as the Pon_tx command 842 to switch the first current enable signal 114 to logic high and the second current enable signal 116 also to logic high at the step transition time as determined by the measured noise signal 112 provided to sequencer 106.

C/A logic encoder 820 also sends encoded commands 864 to the C/A logic decoder 820 of the memory 892 also via the channel 870. For example, during memory write operations C/A logic encoder 820 enables the Pon_tx command 842 to turn on the transmitter 808 via the first and second current enable signals 114, 116, and C/A logic encoder 820 also sends an encoded command 864 for the memory 892 to be in receive mode to receive the signals transmitted from the memory controller 890. The encoded commands 864 are decoded by the C/A logic decoder 821, and the outputs (such as Pon_tx_mem 860) of the decoded commands are provided to sequencer circuit 856 of the memory 892 to switch the first current enable signal 854 to logic high and the second current enable signal 856 also to logic high at a step transition time as determined by the measured noise signal 862 provided to sequencer 856. In this regard, noise measurement circuit 804 provides the measured noise signal 862 to the sequencer circuit 856 of the memory 892 via a sideband channel for controlling memory sequencer timing (step transition times in the memory). The sequencer circuit 856 and the transmitter circuit 852 of memory 892 operate in a manner similar to the operation of the sequencer circuit 106 and the transmitter circuit 808 of memory controller 890, respectively. The operation of the circuitry of FIG. 8B is illustrated in further detail below with reference to FIG. 11.

Figure 9:
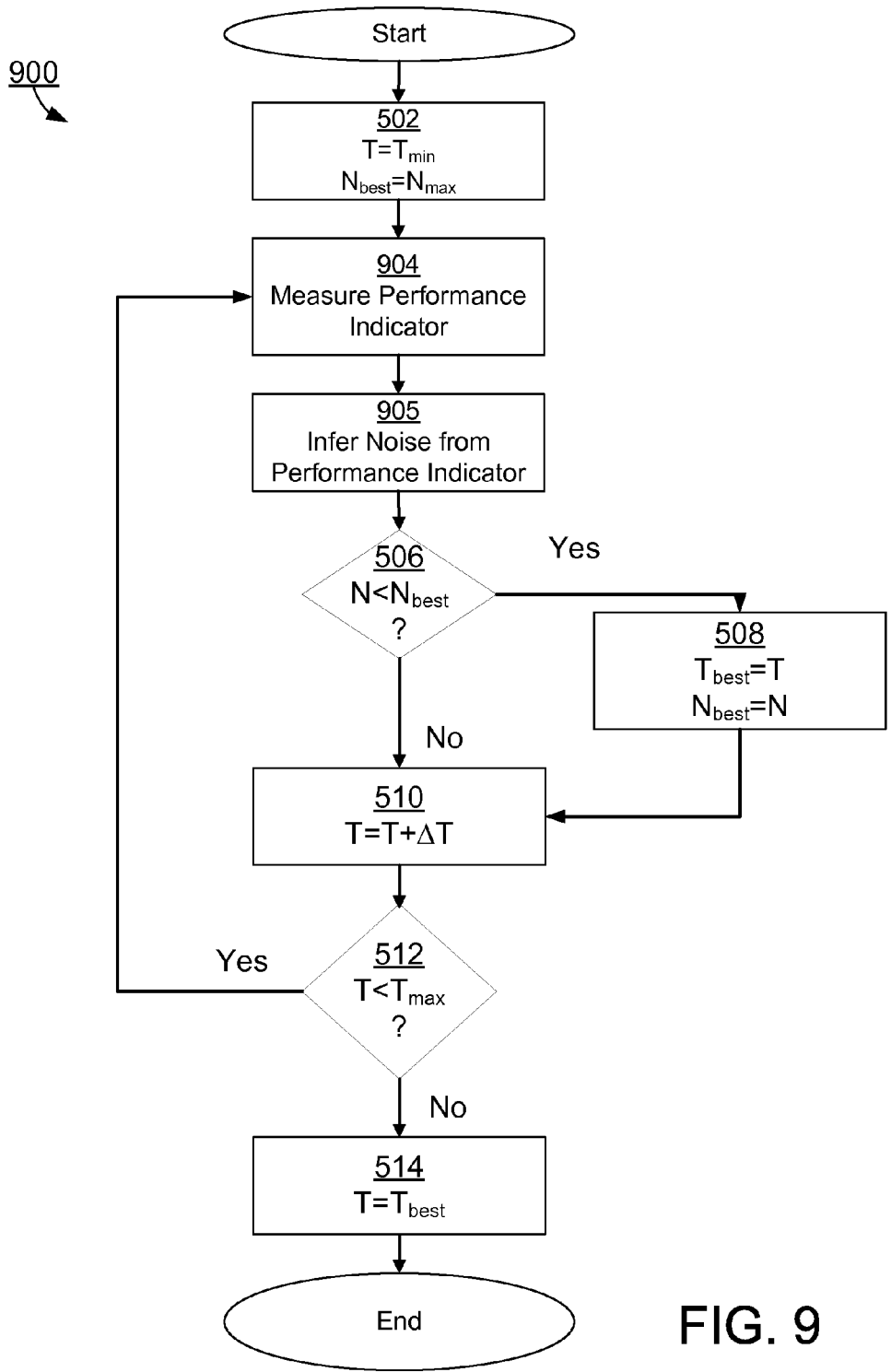
FIG. 9 is a flow chart illustrating a process for determining the optimal step transition times of a two-step load current, according to an alternative embodiment of the present disclosure.

FIG. 9 is a flow chart illustrating a process for determining the optimal step transition times of a two-step load current, according to an alternative embodiment of the present disclosure. The process 900 of FIG. 9 is similar to the process 500 of FIG. 5, except that step 504 of FIG. 5 is replaced by steps 904 and 905 in FIG. 9. At step 904, performance indicator 812 (FIG. 8) is measured, and at step 905 noise (N) of the PDN 102 is inferred from the measured performance indicator 812. The inferred noise N is used in step 506 for comparison with $N_{best}$.

Figure 10:
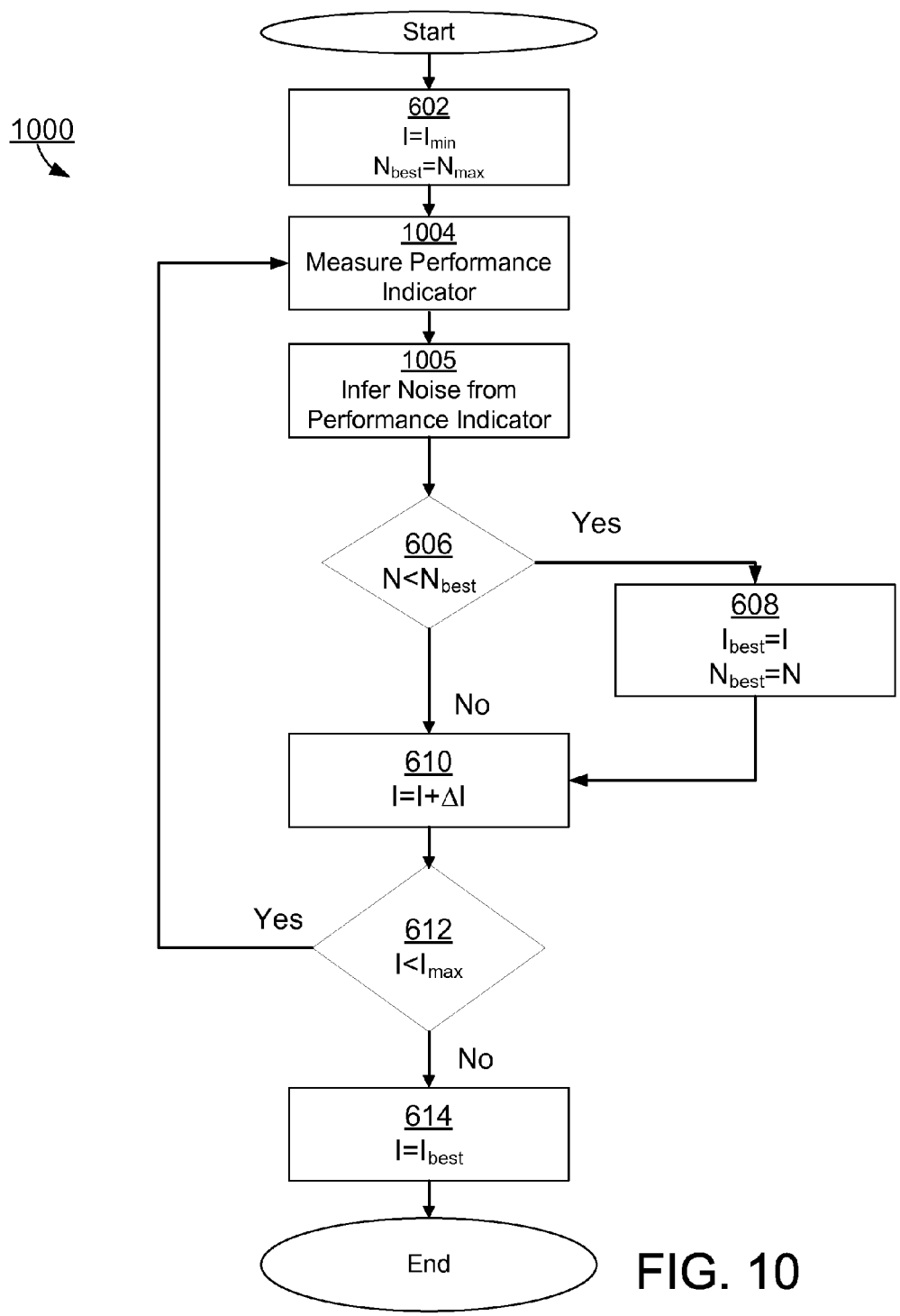
FIG. 10 is a flow chart illustrating a process for determining the optimal first step size for the load current, according to an alternative embodiment of the present disclosure.

FIG. 10 is a flow chart illustrating a process for determining the optimal first step size (I) for the load current, according to an alternative embodiment of the present disclosure. A second step size is also varied according to the determined optimal first step size such that the two current steps (the first step size and the second step size) always sum to the same steady state load current. The process 1000 of FIG. 10 is similar to the process 600 of FIG. 6, except that step 604 of FIG. 6 is replaced by steps 1004 and 1005 in FIG. 10. At step 1004, performance indicator 812 (FIG. 8) is measured, and at step 1005 noise (N) of the PDN 102 is inferred from the measured performance indicator 812. The inferred noise N is used in step 606 for comparison with $N_{best}$.

Figure 11:
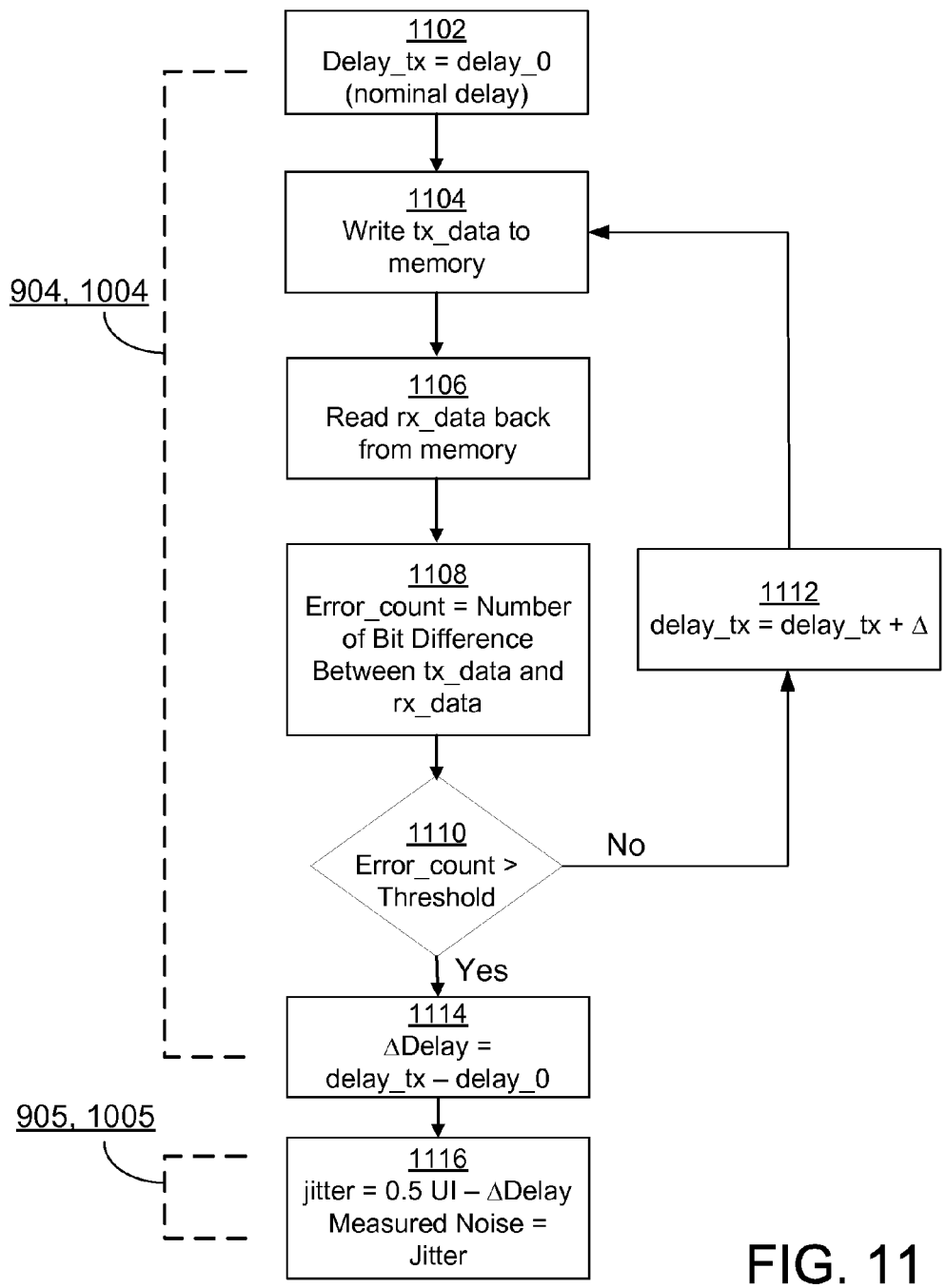
FIG. 11 is a flow chart illustrating the steps of measuring a performance indicator and determining noise from the performance indicator in more detail, according to an alternative embodiment of the present disclosure.

FIG. 11 is a flow chart illustrating step 904, 1004 (FIGS. 9 and 10) of measuring a performance indicator and the step 905, 1005 (FIGS. 9 and 10) of determining noise from the performance indicator in more detail, according to an alternative embodiment of the present disclosure. FIG. 11 is illustrated in conjunction with the embodiment shown in FIG. 8B. Steps 1102 through 1114 of FIG. 11 may correspond to step 904 or 1004 of FIGS. 9 and 10, and step 1116 of FIG. 11 may correspond to step 905 or 1005 of FIGS. 9 and 10.

Referring to both FIG. 8B and FIG. 11, at step 1102 noise measurement circuit 804 sets delay_tx signal 834 to timing adjust circuit 824 at its nominal delay value, delay_0. At step 1104, noise measurement circuit 804 causes transmitter 808 to write tx_data 836 to the memory 892 (memory core 854) via the transmitter 808—receiver 866 pair, by generating command signal 840 to switch the first current enable signal 114 to logic high and the second current enable signal 116 also to logic high at a step transition time as determined by the measured noise signal 112 provided to sequencer 106 and command signal 864 to switch the memory 892 to receive mode. As a result, transmitter 808 will send the tx_data 836 at clock timings slightly delayed by the delayed clock signal 834, which in the first occurrence of step 1102 is just the nominal delay value, delay_0. At step 1106, noise measurement circuit 804 causes the previously written data to be read back as rx_data 828 from memory 892 (memory core 854) via transmitter 852—receiver 826 pair, by generating command signal 862 to switch the first current enable signal 854 to logic high and the second current enable signal 856 also to logic high at a step transition time as determined by the measured noise signal 862 provided to sequencer 856 and command signal 840 to switch the memory controller 890 to receive mode.

At step 1108, noise measurement circuit 804 determines the number of bit differences between the tx_data 836 and rx_data 828, i.e., Error_Count. At step 1110, if Error_Count is not larger than a predetermined threshold, at step 1112 noise measurement circuit 804 adds a predetermined value Δ to delay_tx 834 and repeats steps 1104 through 1110. In each repeated occurrence of steps 1104 through 1110, delay_tx 834 is increased by predetermined value Δ and thus the tx_data 836 is transmitted from memory controller 890 and 892 with successively degraded timing margin. Eventually the timing margin degrades sufficiently that at the next occurrence of step 1110 Error_count will be greater than the predetermined threshold in step 1110. In that case operation continues at step 1114 where noise measurement circuit 804 determines the total delay added to the delayed transmitter clock signal 838, i.e., ΔDelay=delay_tx−delay_0. This is a measure of how much the timing margin had to be reduced to create an Error Count greater than the predetermined threshold, and therefore provides a measure of the operating timing margin at the nominal delay_tx value of delay_0. At step 1116, noise measurement circuit 804 determines the jitter (or measured noise 112, 862) of the entire memory controller 890—channel 870—memory 892 system caused by both PDNs 102, 802 as: jitter=0.5 UI−ΔDelay, where UI is the unit interval, or the period of a single bit transmission. This jitter determination varies in a complementary manner to the timing margin measurement ΔDelay. To the extent that noise on the PDN affects the link jitter when transmitter 808 is turned on at step 1104, the method of FIG. 11 thus measures a performance indicator sensitive to PDN noise, which is suitable for steps 904/905 or 1004/1005 in FIG. 9 or FIG. 10.

Figure 12:
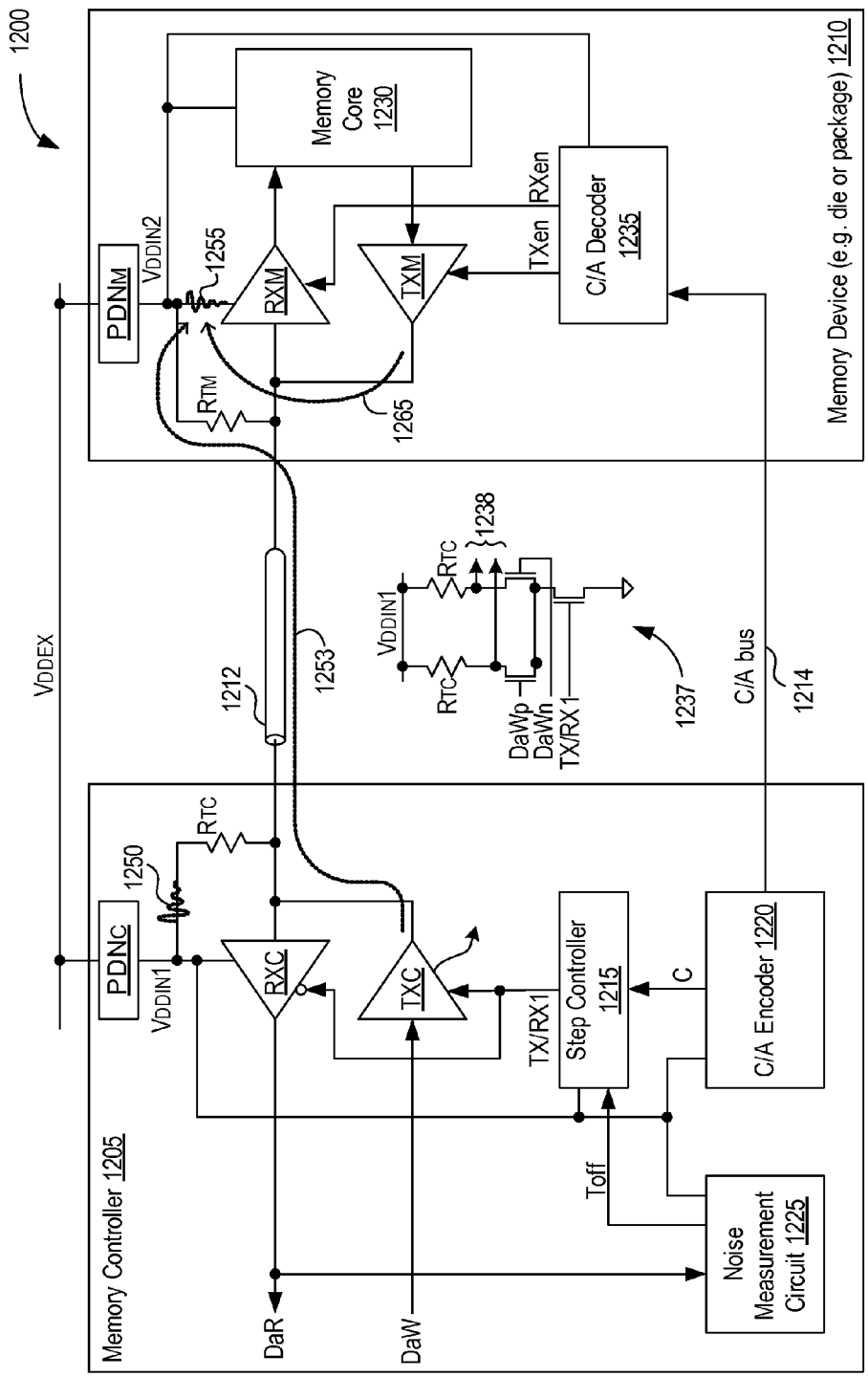
FIG. 12 is a schematic illustrating a memory system 1200 in accordance with another embodiment.

FIG. 12 is a schematic illustrating a memory system 1200 in accordance with another embodiment. System 1200 includes a memory controller 1205 and a memory device 1210 (e.g., a packaged or bare die), the respective PDNs of which are connected to a common external supply node $V_{DDEX}$. Controller 1205 is operatively coupled to memory 1210 via a bidirectional communication channel 1212 and a command and address (C/A) bus 1214.

Memory controller 1205 includes a receiver RXC, a transmitter TXC, a step controller 1215 (e.g. a sequencer), a C/A encoder 1220, and a noise measurement circuit 1225. Each of these elements receives an internal supply voltage $V_{DDIN1}$ via the external supply node $V_{DDEX}$, of a power-supply distribution network $PDN_C$, though only the input and output portions of the transmit and receive circuitry are so supplied in other embodiments. For example, the input/output circuitry may use a higher supply voltage than the remaining logic. Likewise, the external supply node $V_{DDEX}$ supplies internal voltage $V_{DDIN2}$ via a second distribution network $PDN_M$ to each of a receiver RXM, a transmitter TXM, a memory core 1230, and a C/A decoder 1235 on memory device 1210, though only the input/output circuitry may be so supplied in other embodiments.

C/A encoder 1220 initiates a write transaction by sending a transmit command on internal bus C to step controller 1215 and a write command with associated address information to decoder 1235 via external C/A bus 1214. Responsive to the transmit command, step controller 1215 asserts transmit/receive signal TX/RX1, which enables transmitter TXC and disables receiver RXC in preparation for transmitting write data DaW. Responsive to the write command, decoder 1235 on the memory device de-asserts transmit-enable signal TXen and asserts receive-enable signal RXen in preparation for receiving the write data.

Transmitter TXC is a pull-down transmitter in this example, which means that transmitter TXC expresses data by selectively pulling the voltage on its output node down from $V_{DDIN1}$ through a termination element, a resistor $R_{TC}$. Transmitter TXC, while typically differential, is shown as single-ended for ease of illustration. Transmitter TXM is likewise a pull-down transmitter in this example.

Enabling transmitter TXC pulls current through termination resistors $R_{TC}$ and $R_{TM}$ from respective supply networks $PDN_C$ and $PDN_M$, and consequently produces supply noise at each end of channel 1212. On the controller side, this supply noise is illustrated as a noise artifact 1250 on node $V_{DDIN1}$. On the memory side, and with reference to arrow 1253, the current drawn by transmitter TXC traverses channel 1212 to induce noise at supply node $V_{DDIN2}$, which is shown as a second noise artifact 1255. Also on the memory side, and with reference to arrow 1265, enabling or disabling transmitter TXM similarly produces supply noise at node $V_{DDIN2}$, which contributes to noise artifact 1255. Receiver RXM is sensitive to supply noise, so the noise artifacts from both transmitters TXC and TXM can induce write errors. (Noise artifacts can also interact with noise from other sources, such as from activating receiver RXM, but these sources are omitted from this discussion for brevity.)

In system 1200, controller 1205 initiates read and write transactions, and thus dictates the timing of noise artifacts 1253 and 1265. In the worst case, noise artifacts 1253 and 1265 can combine additively at receiver RXM to maximize the amplitude and duration of noise artifact 1255. If timed properly, however, the noise from transmitters TXC and TXM can destructively interfere with one another and with other noise, and can thus minimize the amplitude and duration of noise artifact 1255. To this end, step controller 1215 is adapted to sweep the timing for enabling transmitter TXC with respect to the disabling of transmitter TXM to find the timing offset that produces the lowest bit-error rate (BER).

Using the BER as a measure of merit may be better than a direct measure of supply noise. In the example of FIG. 12, for example, noise from transmitters TXC and TXM show up at the input node or nodes of receiver RXM as well as on the supply node. Differential receivers are adept at rejecting such common-mode noise, as well as supply noise, but either or both noise sources may dominate. Basing the phase adjustment between the opposing transmitters on the best error performance addresses whichever noise source is more problematic.

To develop the appropriate relative timing of artifacts 1253 and 1265, memory controller 1205 writes patterns into memory core 1230 while step controller 1215, at the direction of noise-measurement circuit 1225, runs through a range of timing offsets Toff that phase adjust noise at node $V_{DDIN2}$ from transmitter TXC with respect to the portion of artifact 1255 induced by transmitter TXM. Memory controller 1205 reads back the data from memory core 1230 so that noise-measurement circuit 1225 can compare the read data DaR to the originally transmitted patterns, noting any errors. This process may be similar to what was described earlier on connection with other embodiments, and so is omitted here for brevity. The resulting BERs are then correlated to the timing offsets Toff to determine which timing offset or range of offsets produced the lowest BER. The offset resulting in the lowest BER, or the center of a range of such offsets, is then stored and employed for later write transactions. The process of developing the appropriate relative timing of artifacts 1253 and 1265 can be repeated to accommodate changes in the noise environment due to e.g. supply and temperature fluctuations.

System 1200 enables transmitter TXC to phase adjust induced supply noise in this embodiment. Step controller 1215 thus controls the phase of a single step, while the remaining step is provided in the memory device. In other arrangements, step controller 1215 can shape its noise contribution using e.g. stepped currents in the manner detailed above in connection with other embodiments. In still other embodiments, memory device 1210 can be adapted to include a step controller that further conditions the supply response at receiver RXM. Also, receiver RXC in controller 1205 can be susceptible to noise in much the same way a receiver RXM, so some embodiments control supply noise to minimize noise artifacts on supply nodes of receiver RXC during read operations. For example, controller 1205 can time noise artifacts from both transmitters such that they cancel one another at node $V_{DDIN1}$, the input node of receiver RXC, or both.

A simplified schematic of a differential amplifier stage 1237 for use in transmitter TXC is shown at the center of FIG. 12. This differential example includes two termination elements, each of which is disposed between supply node $V_{DDIN1}$ and one of two differential output nodes 1238 of the transmitter. When signal TX/RX1 is asserted, amplifier stage 1237 amplifies and inverts complementary signals DaWp and DaWn, the complementary equivalent to data signal DaW discussed above, by alternatively changing the balance of current between the two termination element, and thus the voltage across the output nodes of the amplifier. Asserting signal TX/RX1 enables the lowermost transistor and induces supply noise as noted previously. Transmitter TXM on the memory side can be similar. In that case, the transistor or transistors that enable transmitter TXM are connected in parallel with the lowermost transistor of transmitter TXC between supply node $V_{DDIN2}$ and ground. Many other suitable amplifier configurations can be used, as will be readily understood by those of skill in the art.

Upon reading this disclosure, those of ordinary skill in the art will appreciate still additional alternative structural and functional designs for increasing in multiple steps the load current of a circuit powered by a power distributed network, through the disclosed principles of the present disclosure. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A system, comprising:
a first circuit powered by a power distribution network and configured to receive a control signal that is based on communication of one or more output signals outputted by the first circuit, the control signal causing transient load current of the first circuit to increase in magnitude in a plurality of steps at a plurality of step transition times according to the control signal, and the first circuit further configured to generate the one or more output signals, a value of the one or more output signals based on the magnitude of the transient load current;
a second circuit configured to communicate with the first circuit to receive the one or more output signals from the first circuit;
a noise measurement circuit configured to generate a noise measurement signal indicative of noise in the power distribution network based on the communication of the one or more output signals from the first circuit to the second circuit; and
a sequencer circuit configured to receive the noise measurement signal based on the communication of the one or more output signals and generate the control signal causing the transient load current of the first circuit to increase in magnitude.

2. The system of claim 1, wherein the control signal includes a first enable signal and a second enable signal, the transient load current increasing by a first step at a first step transition time responsive to the first enable signal and the transient load current increasing by a second step at a second step transition time responsive to the second enable signal.

3. The system of claim 2, wherein the first step and the second step are equal steps.

4. The system of claim 2, wherein a ratio of the second step to the first step is $e^{-\pi/(2Q)}$, where Q is a Q factor of the power distribution network.

5. The system of claim 2, wherein the sequencer includes a memory storing a value representative of the second step transition time, the value being programmable.

6. The system of claim 2, wherein the first step transition time corresponds to a beginning of a resonance period of the power distribution network and the second step transition time corresponds to half of the resonance period of the power distribution network.

7. The system of claim 2, wherein the first circuit comprises a first pair of transistors connected in series to each other and a second pair of transistors connected in series to each other, the first pair of transistors connected to the second pair of transistors in parallel and configured to generate the transient load current together, the first pair of transistors being turned on responsive to the first enable signal at the first step transition time to increase the transient load current by the first step but the second pair of transistors being off.

8. The system of claim 7, wherein the first pair of transistors remain on and the second pair of transistors are turned on responsive to the second enable signal at the second step transition time to increase the transient load current by the second step.

9. The system of claim 1, wherein the noise signal is indicative of the noise caused by resonance in the power distribution network and measured at a node between the first circuit and the power distribution network.

10. The system of claim 1, wherein the noise signal is representative of the resonant period of the power distribution network.

11. The system of claim 1, wherein the noise measurement circuit receives a performance indicator signal indicative of performance of the first circuit powered by the power distribution network, and generates the noise signal based upon the performance indicator signal.

12. The system of claim 1, wherein the first circuit comprises a memory controller and the second circuit comprises a memory device, and the power distribution network comprises a first power distribution network and a second power distribution network powering the memory controller and the memory device, respectively, and the noise measurement circuit is configured to determine a bit error ratio between data written to and read back from the memory device by the memory controller and generate the noise signal based upon the bit error ratio.

13. The system of claim 1, wherein the sequencer dynamically determines at least one of the step transition times corresponding to one of the plurality of steps based on the noise signal.

14. The system of claim 1, wherein the sequencer comprises:
a counter configured to receive a clock signal and generate a counter output signal;
a timing register storing a register value indicating at least one step transition time corresponding to one of the plurality of steps; and
a logic circuit configured to generate the control signal based on a comparison of the counter output signal and the register value.

15. A method for determining a step transition time at which transient load current of a first circuit powered by a power distribution network is increased in magnitude in a plurality of steps at a plurality of step transition times and the first circuit generates one or more output signals, a value of the one or more output signals based on the magnitude of the transient load current, the first circuit communicating the one or more output signals to a second circuit, the method comprising:
obtaining a measure of transient noise caused by the power distribution network based on the communication of the one or more output signals from the first circuit to the second circuit;
adjusting the plurality of step transition times based on the measured transient noise; and
generating a control signal that is outputted to the first circuit, the control signal causing the transient load current of the first circuit to increase in magnitude in the plurality of steps at the adjusted plurality of step transition times.

16. The method of claim 15, wherein the plurality of step transition times are adjusted within a range of values to minimize the transient noise.

17. The method of claim 15, wherein an optimal plurality of step transition times are predetermined and stored in a memory.

18. The method of claim 15, wherein an optimal plurality of step transition times are determined dynamically while the first circuit is in operation.

19. The method of claim 15, wherein the transient noise is determined based upon a performance indicator signal indicative of performance of the first circuit.

20. The method of claim 15, wherein the transient noise is determined based upon a bit error ratio between data written to and read back from a memory device by a memory controller.

21. A method for determining a step size of at least one of a plurality of steps by which transient load current of a first circuit powered by a power distribution network is increased, the method comprising:

obtaining a measure of transient noise caused by the power distribution network based on communication of one or more output signals outputted by the first circuit to a second circuit; and adjusting a magnitude of a plurality of steps based on the measured transient noise; and generating a control signal that is outputted to the first circuit, the control signal causing the transient load current of the first circuit to increase in magnitude in the plurality of steps.

22. The method of claim 21, wherein the plurality of steps are adjusted within a range of values to minimize the transient noise.

23. The method of claim 21, wherein the transient noise is measured at a node between the circuit and the power distribution network.

24. The method of claim 21, wherein the transient noise is determined based upon a performance indicator signal indicative of performance of the circuit.

25. The method of claim 21, wherein the transient noise is determined based upon a bit error ratio between data written to and read back from a memory device by a memory controller.

26. A system comprising:
a power-distribution network having a first supply node;
a communication channel;
a termination element disposed between the first supply node and the communication channel;
at least one transmitter having first and second transistors coupled between the first supply node and a second supply node, wherein enabling the first transistor draws a first current through the termination element and enabling the second transistor draws a second current through the termination element;
a noise-measurement circuit to generate a noise signal indicative of noise on the first supply node; and
a step controller coupled to the noise-measurement circuit and the first and second transistors, wherein the step controller adjusts a delay between the enabling of the first transistor and the enabling of the second transistor responsive to the noise signal.

27. The system of claim 26, wherein the first transistor is instantiated on a first integrated circuit and the second transistor is instantiated on a second integrated circuit.

28. The system of claim 26, wherein the first and second transistors are instantiated together on an integrated circuit.

29. The system of claim 26, wherein the communication channel is a differential channel.

* * * * *